United States Patent
Akahori et al.

(10) Patent No.: US 7,801,337 B2
(45) Date of Patent: Sep. 21, 2010

(54) FACE DETECTION METHOD, DEVICE AND PROGRAM

(75) Inventors: Sadato Akahori, Kanagawa-ken (JP); Kensuke Terakawa, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 923 days.

(21) Appl. No.: 11/652,512

(22) Filed: Jan. 12, 2007

(65) Prior Publication Data
US 2007/0165951 A1    Jul. 19, 2007

(30) Foreign Application Priority Data
Jan. 16, 2006    (JP) ............................. 2006-007542

(51) Int. Cl.
*G06K 9/00*    (2006.01)
(52) U.S. Cl. ...................................... 382/118
(58) Field of Classification Search .................. 382/118
See application file for complete search history.

(56) References Cited

U.S. PATENT DOCUMENTS

| | | | |
|---|---|---|---|
| 6,292,574 B1 * | 9/2001 | Schildkraut et al. | 382/117 |
| 6,895,112 B2 * | 5/2005 | Chen et al. | 382/167 |
| 2005/0100195 A1 | 5/2005 | Li | |
| 2007/0122034 A1 * | 5/2007 | Maor | 382/181 |
| 2008/0080746 A1 * | 4/2008 | Payonk et al. | 382/118 |
| 2008/0107341 A1 * | 5/2008 | Lu | 382/190 |

OTHER PUBLICATIONS

Shihong Lao et al., "Fast Omni-Directional Face Detection", Meeting on Image Recognition and Understanding, pp. II271-II276, Jul. 2004.

* cited by examiner

*Primary Examiner*—Brian P Werner
(74) *Attorney, Agent, or Firm*—Birch, Stewart, Kolasch & Birch, LLP

(57) ABSTRACT

To detect a face image in an inputted image, predetermined-size partial images are cut out at different positions in the inputted image. An indicator value indicating a probability of each partial image being the face image is calculated. The partial images having the indicator values not less than a first threshold are extracted as candidate face images. Each candidate is set as a candidate of interest. If any nearby candidate is present within a predetermined coordinate distance from the candidate of interest, the candidate of interest and the nearby candidate are set in one candidate group. For each candidate group, an integrated indicator value reflecting the indicator values calculated for the candidates forming the candidate group is calculated. Then, an image within a predetermined area in the inputted image containing the candidate group having the integrated indicator value not less than a second threshold is extracted as the face image.

24 Claims, 17 Drawing Sheets

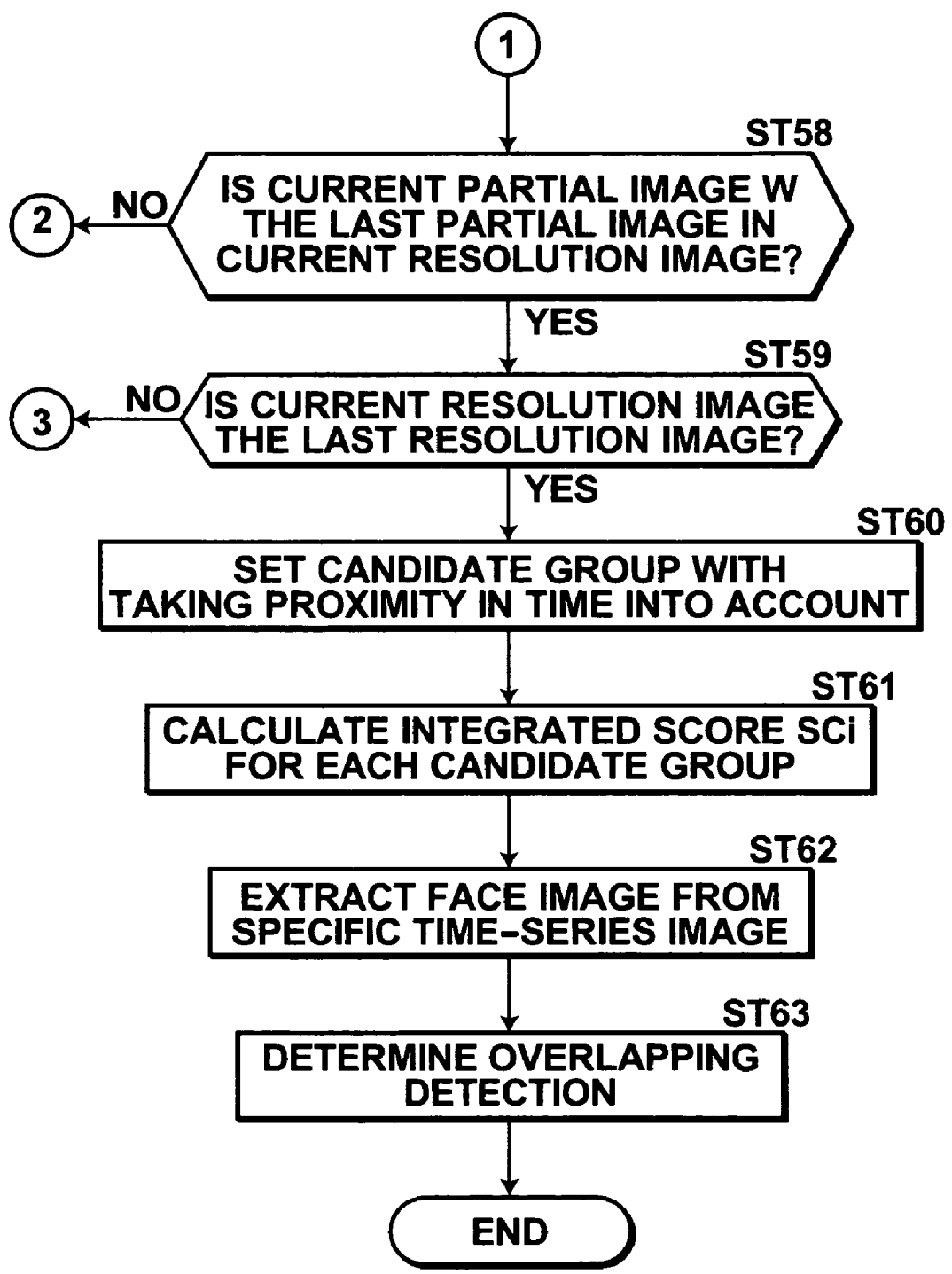

FACE DETECTION METHOD, DEVICE AND PROGRAM

BACKGROUND OF THE INVENTION

1. Field of the Invention

The present invention relates to a face detection method and a face detection device for detecting face images from digital images, as well as a program therefor.

2. Description of the Related Art

Techniques such as checking color distribution in a human face area contained in a snapshot taken with a digital camera to correct the skin color of the face, or recognizing a person in digital images taken with a digital video camera of a monitoring system have conventionally been conducted. In such cases, it is necessary to detect a face area that corresponds to a human face in a digital image, and therefore, various methods for detecting images containing faces (face images) in digital images have been proposed.

In one method, for example, in order to detect a face image in an image subjected to detection, partial images are cut out at different positions in the image subjected to detection, and determination is made on each partial image as to whether or not it is the face image. Techniques for determining whether or not a certain partial image is a face image include, for example, a technique using template matching, or a technique using a classifier module that have learned features of faces through a machine learning process (see, for example, "Fast Omni-Directional Face Detection", Shihong LAO et al., Meeting on Image Recognition and Understanding, pp. II271-II276, July 2004, and U.S. Patent Application Publication No. 20050100195). For this discrimination carried out in these techniques, it is common to use a technique in which an indicator value that indicates a probability of a partial image being a face image is calculated based on an image pattern of the partial image, and if the indicator value exceeds a predetermined threshold value, the partial image is determined to be the face image.

However, in the face detection method, such as those described above using the discrimination technique where determination is made on the indicator values based on the image patterns using a threshold value, if a non-face image pattern that happens to raise the indicator value is present in the image subjected to detection, the non-face image may falsely be detected as a face image.

SUMMARY OF THE INVENTION

In view of the above-described circumstances, the present invention is directed to provide a face detection method and a face detection device that can reduce false detection of face images, as well as a program therefor.

A first aspect of the face detection method according to the invention is a face detection method for detecting a face image contained in an inputted image, the method comprising the steps of: cutting out partial images having a predetermined size at different positions in the inputted image; calculating, for each of the partial images cut out at the different positions, an indicator value indicating a probability of the partial image being the face image; extracting all the partial images having the calculated indicator values not less than a first threshold value as candidates for the face image; setting each of the candidates as a candidate of interest, and when any nearby candidate, whose coordinate distance from the candidate of interest is not more than a predetermined distance, is present in the candidates other than the candidate of interest, setting the candidate of interest and the nearby candidate in one candidate group; calculating for each candidate group, based on the indicator values calculated for the candidates forming the candidate group, an integrated indicator value reflecting magnitudes of the indicator values; and extracting, as the face image, an image within a predetermined area in the inputted image containing the candidate group having the integrated indicator value not less than a second threshold value.

A second aspect of the face detection method according to the invention is a face detection method for detecting a face image contained in time-series images taken at a predetermined time interval, the method comprising the steps of: cutting out, for each of the time-series images, partial images having a predetermined size at different positions in the time-series image; calculating, for each of the partial images cut out at the different positions in each of the time-series images, an indicator value indicating a probability of the partial image being the face image; extracting all the partial images having the calculated indicator values not less than a first threshold value as candidates for the face image; setting each of the candidates as a candidate of interest, and when any nearby candidate, whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, setting the candidate of interest and the nearby candidate in one candidate group; calculating for each candidate group, based on the indicator values calculated for the candidates forming the candidate group, an integrated indicator value reflecting magnitudes of the indicator values; and extracting, as the face image, an image within a predetermined area containing the candidate in at least one of the time-series images that contain any of the candidates forming the candidate group having the integrated indicator value not less than a second threshold value.

In the first and second aspects of the face detection method according to the invention, the step of cutting out the partial images may include changing the predetermined size into different sizes and cutting out the partial image for each size; and the step of setting the candidate group may include increasing the predetermined distance such that the larger the size of at least one of the candidate of interest and the other candidate, the larger the predetermined distance.

Further, in the first and second aspects of the face detection method according to the invention, the integrated indicator value may, for example, be a sum of the indicator values.

Furthermore, in the first and second aspects of the face detection method according to the invention, the first threshold value may be a minimum value that may be taken by the indicator value. In other words, the face image may be extracted with taking the indicator values of all the partial images into account.

A first aspect of the face detection device according to the invention is a face detection device for detecting a face image contained in an inputted image, the device comprising: a partial image cutting means for cutting out partial images having a predetermined size at different positions in the inputted image; a first indicator value calculating means for calculating, for each of the partial images cut out at the different positions, an indicator value indicating a probability of the partial image being the face image; a face image candidate extracting means for extracting all the partial images having the calculated indicator values not less than a first threshold value as candidates for the face image; a candidate group setting means for setting each of the candidates as a candidate of interest, and when any nearby candidate whose coordinate distance from the candidate of interest is not more than a predetermined distance is present in the candidates other than the candidate of interest, setting the candidate of interest and the nearby candidate in one candidate group; a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area in the inputted image containing the candidate group having the integrated indicator value not less than a second threshold value image.

A second aspect of the face detection device according to the invention is a face detection device for detecting a face image contained in time-series images taken at a predetermined time interval, the device comprising: a partial image cutting means for cutting out, for each of the time-series images, partial images having a predetermined size at different positions in the time-series image; a first indicator value calculating means for calculating, for each of the partial images cut out at the different positions in each of the time-series images, an indicator value indicating a probability of the partial image being the face image; a face image candidate extracting means for extracting all the partial images having the calculated indicator values not less than a first threshold value as candidates for the face image; a candidate group setting means for setting each of the candidates as a candidate of interest, and when any nearby candidate, whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, setting the candidate of interest and the nearby candidate in one candidate group; a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area containing the candidate in at least one of the time-series images that contain any of the candidates forming the candidate group having the integrated indicator value not less than a second threshold value.

In the first and second aspects of the face detection device according to the invention, the partial image cutting means may change the predetermined size into different sizes and cuts out the partial image for each size; and the candidate group setting means may increase the predetermined distance such that the larger the size of at least one of the candidate of interest and the other candidate, the larger the predetermined distance.

Further, in the first and second aspects of the face detection device according to the invention, the integrated indicator value may, for example, be a sum of the indicator values.

Furthermore, In the first and second aspects of the face detection device according to the invention, the first threshold value may be a minimum value that may be taken by the indicator value. In other words, the face image may be extracted with taking the indicator values of all the partial images into account.

A first aspect of the program according to the invention is a program for causing a computer to operate as a face detection device for detecting a face image contained in an inputted image, the program comprising causing the computer to operate as: a partial image cutting means for cutting out partial images having a predetermined size at different positions in the inputted image; a first indicator value calculating means for calculating, for each of the partial images cut out at the different positions, an indicator value indicating a probability of the partial image being the face image; a face image candidate extracting means for extracting all the partial images having the calculated indicator values not less than a first threshold value as candidates for the face image; a candidate group setting means for setting each of the candidates as a candidate of interest, and when any nearby candidate whose coordinate distance from the candidate of interest is not more than a predetermined distance is present in the candidates other than the candidate of interest, setting the candidate of interest and the nearby candidate in one candidate group; a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area in the inputted image containing the candidate group having the integrated indicator value not less than a second threshold value image.

A second aspect of the program according to the invention is a program for causing a computer to operate as a face detection device for detecting a face image contained in an inputted image, the program comprising causing the computer to operate as: a partial image cutting means for cutting out, for each of the time-series images, partial images having a predetermined size at different positions in the time-series image; a first indicator value calculating means for calculating, for each of the partial images cut out at the different positions in each of the time-series images, an indicator value indicating a probability of the partial image being the face image; a face image candidate extracting means for extracting all the partial images having the calculated indicator values not less than a first threshold value as candidates for the face image; a candidate group setting means for setting each of the candidates as a candidate of interest, and when any nearby candidate, whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, setting the candidate of interest and the nearby candidate in one candidate group; a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area containing the candidate in at least one of the time-series images that contain any of the candidates forming the candidate group having the integrated indicator value not less than a second threshold value.

In the first and second aspects of the program according to the invention, the partial image cutting means may change the predetermined size into different sizes and cuts out the partial image for each size; and the candidate group setting means may increase the predetermined distance such that the larger the size of at least one of the candidate of interest and the other candidate, the larger the predetermined distance.

Further, in the first and second aspects of the program according to the invention, the integrated indicator value may, for example, be a sum of the indicator values.

Furthermore, in the first and second aspects of the program according to the invention, the first threshold value may be a minimum value that may be taken by the indicator value. In other words, the face image may be extracted with taking the indicator values of all the partial images into account.

The term "face image" used herein refers to an image that contains an image forming a face.

Further, the "probability" of the partial image being the face image refers to a probability of the partial image being an image that contains an image forming a face having a predetermined size relative to the partial image.

Moreover, the integrated indicator value may take, in the simplest case, a form of a sum the indicator values as described above, however, the integrated indicator value may take various forms such as a sum of squares of the indicator values, a value taking into account a distribution of the coordinate positions of the candidates forming the candidate group, or a sum of the indicator values other than the maximum and minimum indicator values.

BRIEF DESCRIPTION OF THE DRAWINGS

FIG. 17B is a flow chart of the latter part of the process in the face detection system according to the second embodiment.

DESCRIPTION OF THE PREFERRED EMBODIMENTS

Hereinafter, embodiments of the present invention will be described in detail with reference to the drawings.

Figure 1:
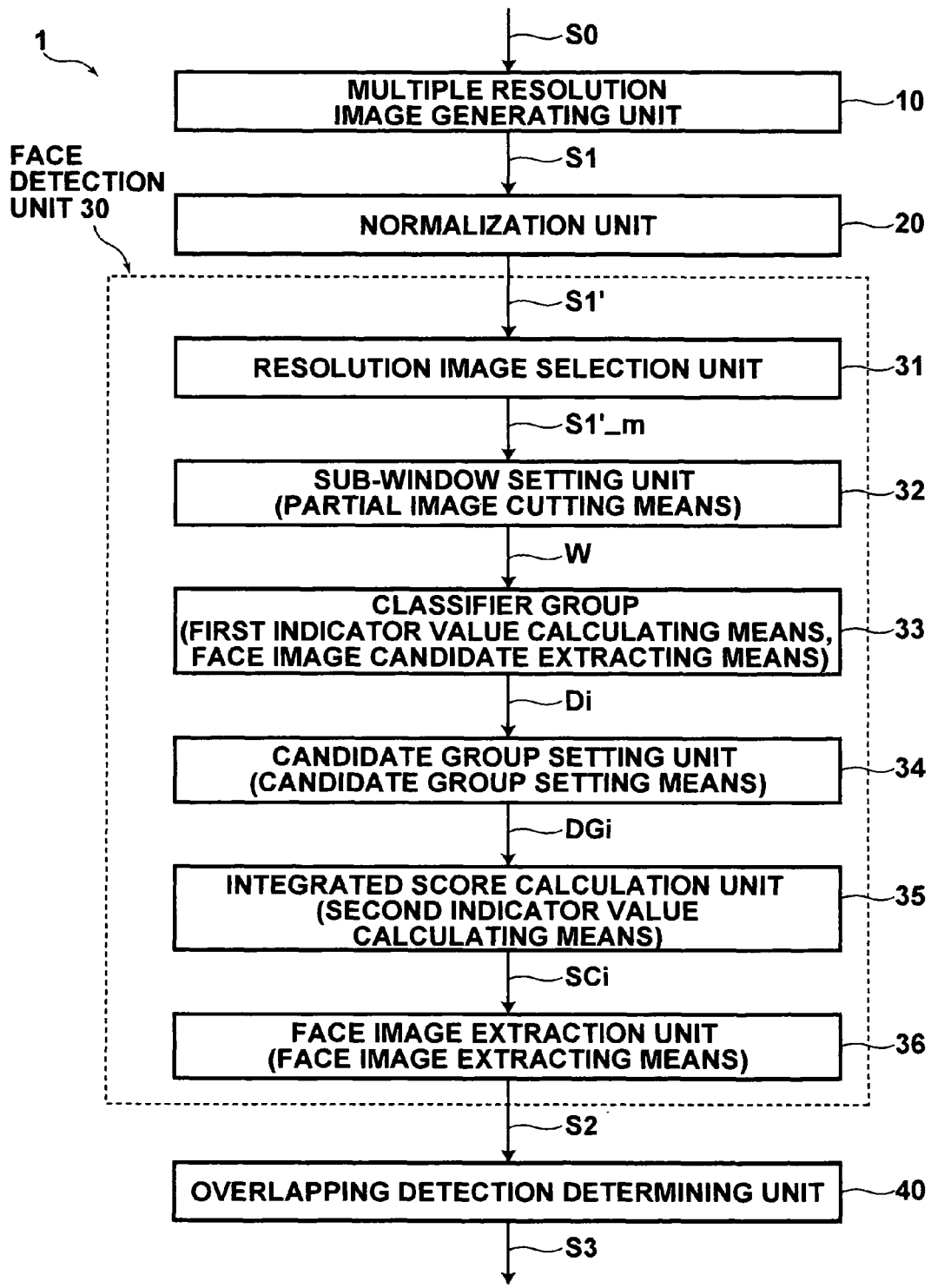
FIG. 1 is a block diagram illustrating the configuration of a face detection system.

FIG. 1 is a schematic block diagram illustrating the configuration of a face detection system 1, which is an embodiment of a first aspect of a face detection device according to the invention (a first embodiment). The face detection system 1 detects images containing faces (hereinafter referred to as face images) having any position, size, inclination (a rotational position within the image plane), and orientation (an orientation in a range of directions from left to right) in inputted digital images. The face detection system 1 employs a face detection technique which has been deemed particularly excellent in detection accuracy and robustness, namely, a technique that uses an indicator value calculating function of a classifier module (hereinafter simply referred to as a classifier) generated through a machine learning process using sample images. In this technique, first, a classifier, which can determine whether or not a certain image is a face image containing a face having predetermined inclination and orientation, is generated through learning of features of faces using different face sample images representing faces having the predetermined inclination and orientation and different non-face sample images representing non-faces. Then, partial images are cut out sequentially at different positions in an image subjected to the face detection (hereinafter referred to as an image subjected to detection). Thereafter, an indicator value that indicates a probability of the partial image being the face image is calculated using the classifier to determine whether or not the partial image of interest or any nearby image is the face image, based on the magnitude of the indicator value, thereby detecting the face image contained in the image subjected to detection.

As shown in FIG. 1, the face detection system 1 includes a multiple resolution image generating unit 10, a normalization unit 20, a face detection unit 30 and an overlapping detection determining unit 40.

The multiple resolution image generating unit 10 applies multiple resolution conversion to an image subjected to detection S0 inputted thereto to obtain a resolution image group S1 formed by multiple images having different resolutions (hereinafter referred to as resolution images).

By converting the image size, i.e., resolution of the image subjected to detection S0, the resolution is standardized to a predetermined resolution, for example, a resolution corresponding to a rectangular image having a size of 416 pixels for the short side thereof, to obtain a standardized image subjected to detection S0'. Then, further resolution conversions are performed based on the standardized image subjected to detection S0' to generate resolution images S1_1 to S1_M (M represents a number of different resolution levels) having different resolutions, thereby obtaining the resolution image group S1. The reason for generating such a resolution image group is as follows. Usually, sizes of faces contained in the images subjected to detection S0 are unknown. On the other hand, the sizes of faces to be detected are uniform due to a process of generating the classifier, which will be described later. Therefore, in order to detect faces which may have sizes different from the fixed size in the images subjected to detection S0', it is necessary to cut out partial images having a predetermined size at different positions in the images having different resolutions, and determine for each partial image whether or not the partial image is the face image.

Figure 2:
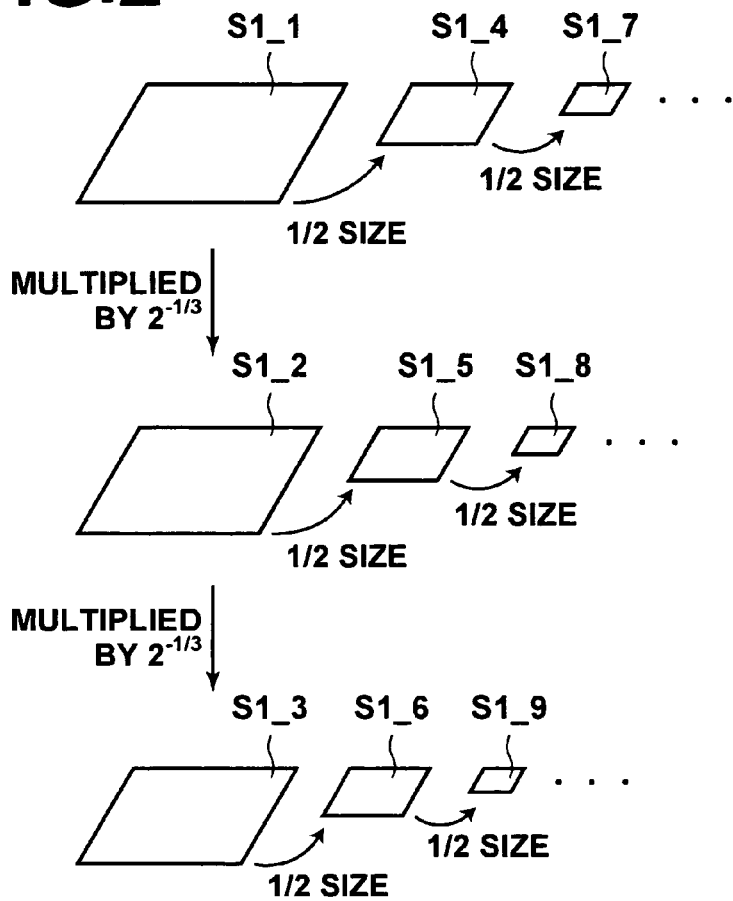
FIG. 2 illustrates steps of multiple resolution conversion of an image subjected to detection.

FIG. 2 illustrates steps for applying the multiple resolution conversion to the image subjected to detection S0. As shown in FIG. 2, in the multiple resolution conversion, i.e., generation of the resolution image group, specifically, the standardized image subjected to detection S0' is set as a resolution image S1_1, which is a base image for the multiple resolution conversion. Then, a resolution image S1_2 having a size of $2^{-1/3}$ times the size of the resolution image S1_1 and a resolution image S1_3 having a size of $2^{-1/3}$ times the size of the resolution image S1_2 (a size of $2^{-2/3}$ times the size of the base image S1_1) are generated. Thereafter, resolution images respectively having reduced sizes of ½ of the resolution images S1_1, S1_2 and S1_3 are generated. Then, resolution images respectively having sizes of ½ of the previously generated size-reduced resolution images are generated. This operation is repeated to generate a predetermined number of resolution images. In this manner, images having sizes reduced by a decrement of $2^{-1/3}$ times can be generated from the base resolution image at high speeds using mainly the size reduction processing into ½ sizes without necessitating interpolation on pixel values representing luminance. For example, if the resolution image S1_1 has a rectangular size of 416 pixels for the short side thereof, the resolution images S1_2, S1_3, . . . , and the like, respectively have rectangular sizes of 330 pixels, 262 pixels, 208 pixels, 165 pixels, 131 pixels, 104 pixels, 82 pixels, 65 pixels, . . . , and the like, for short sides thereof. Thus the resolution images having the sizes reduced by a decrement of $2^{-1/3}$ times can be generated. It should be noted that the images generated in this manner without interpolation of pixel values tend to bear the features of the original image pattern, and therefore, are expected to improve accuracy of the face detection process.

The normalization unit 20 applies global normalization processing and local normalization processing to each of the resolution images so that the resolution images have the contrast suitable for the face detection process, and obtains a resolution image group S1' formed by normalized resolution images S1'_1 to S1'_M.

First, the global normalization processing is explained. The global normalization processing converts the pixel values of the entire resolution image according to a conversion curve that converts the pixel values of the entire resolution image closer to values representing logarithms of the luminance of the subject in the image, so that the contrast of the resolution image approaches to a predetermined level that is suitable for the face detection process, i.e., a level suitable for ensuring performance of the later-described classifier.

Figure 3:
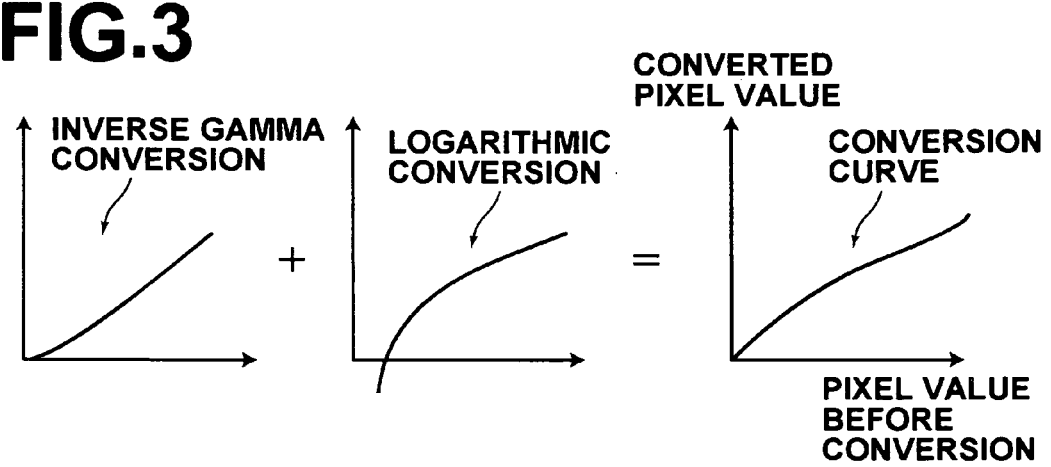
FIG. 3 illustrates an example of a conversion curve used in global normalization processing.

FIG. 3 illustrates one example of the conversion curve used in the global normalization processing. The global normalization processing may, for example, be processing where the pixel values are subjected to so-called inverse gamma conversion in the sRGB color space (i.e., raised to the power of 2.2) as shown in FIG. 3, and then, the pixel values of the entire image are converted according to the conversion curve (a lookup table) that plots logarithmic values. This is because of the following reason.

A light intensity I, which is observed as an image, is usually expressed as a product of a reflectance R of a subject multiplied by an intensity of a light source L (I=R×L). Therefore, when the intensity of light source L changes, the light intensity I observed as the image also changes. Here, if evaluation of only the reflectance R of the subject can be performed, highly accurate face discrimination can be achieved that is independent from the intensity of the light source L, i.e., that is not influenced by the lightness of the image.

Assuming that the intensity of the light source is L, a light intensity I1 is observed at an area having a reflectance R1 on the subject, and a light intensity I2 is observed at an area having a reflectance R2 on the subject, then the following equation is established in a space plotting logarithmic values:

$\log(I1)-\log(I2)=\log(R1 \times L)-\log(R2 \times L)=\log(R1)+\log(L)-(\log(R2)+\log(L))=\log(R1)-\log(R2)=\log(R1/R2)$ That is, through the logarithmic conversion, the pixel values of the image are converted into a space where ratios of the reflectances are expressed as differences. In this space, only the reflectances of the subjects can be evaluated independently from the intensity of the light source L. In other words, the different levels of contrast (the differences between the pixel values in this case) of the images, which depend on the lightness of the respective images, can be converted into the same level.

On the other hand, images taken with typical imaging devices such as digital cameras are in the sRGB color space. The sRGB color space is an international standard with standardized color, saturation, and the like, for color reproduction by various imaging devices. In this color space, pixel values of an image are obtained by raising input luminance values to the power of $1/\gamma_{out}$ (=0.45) so that appropriate color reproduction can be obtained with an image output device with a gamma value ($\gamma_{out}$) of 2.2.

Therefore, by applying the so-called inverse gamma conversion to the pixel values of the entire image, i.e., raising the pixel values to the power of 2.2, and then converting the pixel values according to the conversion curve that plots logarithmic values, appropriate evaluation which is based only on the reflectance of the subject and independent from the intensity of the light source can be achieved.

The global normalization processing, as described above, can be said in other words to be processing that converts the pixel values of the entire image according to a conversion curve that converts a specific color space into another color space having different characteristics.

By applying this processing to the images subjected to detection, the contrast levels of the respective images that differ from each other depending on the lightness of the respective images can be converted into the same level, thereby improving accuracy of the face detection process. It should be noted that the results of the global normalization processing tend to be influenced by differences between the images subjected to detection due to lighting conditions such as oblique lighting, backgrounds and input modalities, however, the processing time thereof is short.

Next, the local normalization processing is explained. The local normalization processing reduces variation in the contrast between local areas in the resolution images. Namely, for each local area in the resolution images, if a degree of distribution of the pixel values representing the luminance of the local area is not less than a predetermined level, a first luminance scale conversion is applied to the local area to convert the degree of distribution close to a certain level that is higher than the predetermined level, and if the degree of distribution of the pixel values of the local area is lower than the predetermined level, a second luminance scale conversion is applied to the local area to convert the degree of distribution to a level lower than the certain level. It should be noted that the local normalization processing takes a long processing time, however, influence of differences between the images subjected to detection due to lighting conditions such as oblique lighting, backgrounds and input modalities on the results of discrimination is small.

Figure 4:
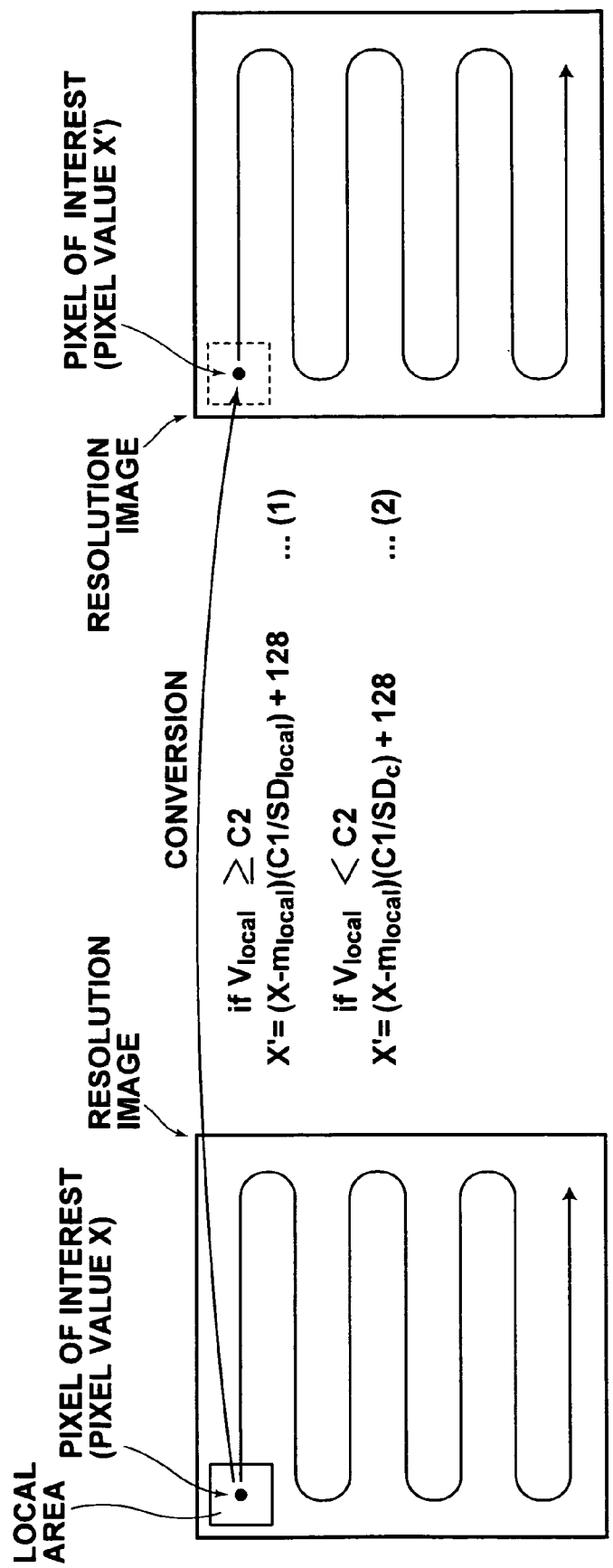
FIG. 4 illustrates the concept of local normalization processing.
Figure 5:
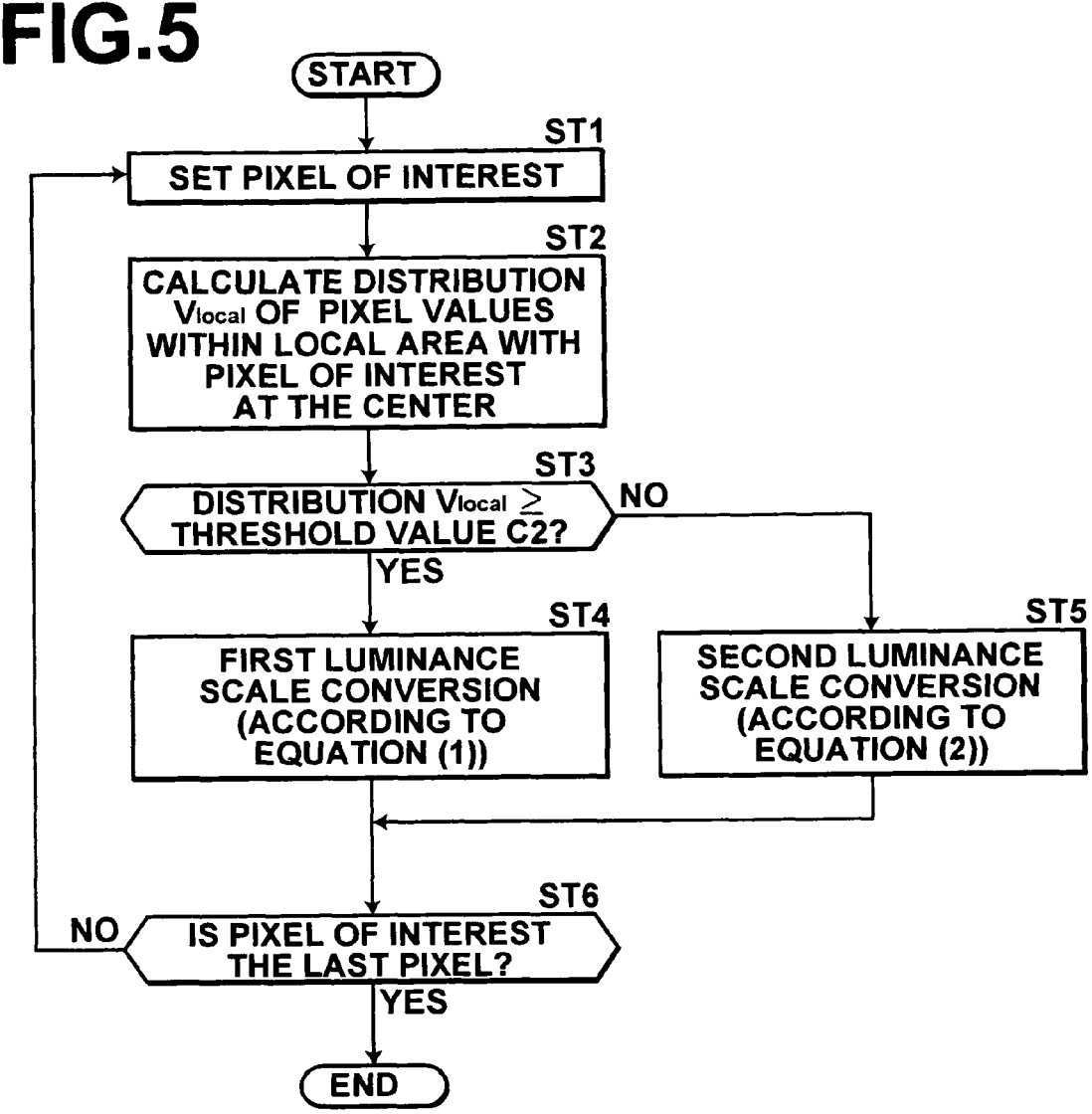
FIG. 5 is a flow chart of the local normalization processing.

FIG. 4 is a diagram illustrating the concept of the local normalization processing, and FIG. 5 illustrates the flow of the local normalization processing. Further, equations (1) and (2) represent the luminance scale conversion of the pixel values for the local normalization processing:

if $V_{local} \geq C2$ $X'=(X-m_{local})(C1/SD_{local})+128$ \hfill (1)

if $V_{local} < C2$ $$X' = (X - m_{local})(C1/SD_C) + 128 \quad (2)$$

wherein X represents a pixel value of a pixel of interest, X' represents a converted pixel value of the pixel of interest, $M_{local}$ represents a mean of the pixel values within the local area with the pixel of interest at the center, $V_{local}$ represents a distribution of the pixel values within the local area, $SD_{local}$ represents a standard deviation of the pixel values within the local area, C1 represents a value that yields a result of (C1× C1) being a reference value that corresponds to the above-described certain level, C2 represents a threshold value that corresponds to the above-described predetermined level, and $SD_C$ represents a predetermined constant. It should be noted that, in this embodiment, 8-bit luminance values are used for the luminance scale, and therefore, the pixel values may take numerical values ranging from 0 to 255.

As shown in FIG. 4 (and FIG. 5), first, one pixel in the resolution image is set as a pixel of interest (step ST1). Then, the distribution $V_{local}$ of the pixel values within the local area with the pixel of interest at the center, having a predetermined size (11×11 pixel size, for example), is calculated (step ST2). Then, whether or not the distribution $V_{local}$ is less than the threshold value C2 that corresponds to the predetermined level is determined (step ST3). If it is determined in step ST3 that the distribution $V_{local}$ is not less than the threshold value C2, then a luminance scale conversion according to equation (1) is carried out as the above-described first luminance scale conversion (step ST4), which reduces a difference between the pixel value X of the pixel of interest and the mean $m_{local}$ when the distribution $V_{local}$ is greater than the reference value (C1×C1) that corresponds to the certain level such that the larger the difference between the $V_{local}$ and the reference value (C1×C1), the smaller the difference between the pixel value X of the pixel of interest and the mean $m_{local}$, or increases the difference between the pixel value X of the pixel of interest and the mean $m_{local}$ when the distribution $m_{local}$ is smaller than the reference value (C1×C1) such that the larger the difference between the $m_{local}$ and the reference value (C1×C1), the larger the difference between the pixel value X of the pixel of interest and the mean $M_{local}$. On the other hand, if it is determined in step ST3 that the distribution $V_{local}$ is less than the threshold value C2, then a linear luminance scale conversion according to equation (2), which does not take the distribution $V_{local}$ into account, is carried out as the second luminance scale conversion (step ST5). Then, determination is made as to whether or not the pixel of interest set in step ST1 is the last pixel (step ST6). If it is determined in step ST6 that the pixel of interest is not the last pixel, the process returns to step ST1, where a next pixel in the same resolution image is set as the pixel of interest. On the other hand, if it is determined in step ST6 that the pixel of interest is the last pixel, the local normalization process for that resolution image ends. By repeating the operations in steps ST1 to ST6, the local normalization is applied to the entire resolution image.

It should be noted that the predetermined level may vary depending on the entire or partial luminance of the local area. For example, in the above-described normalization processing for carrying out the luminance scale conversion for each pixel of interest, the threshold value C2 may change depending on the pixel value of the pixel of interest. Namely, when the luminance of the pixel of interest is relatively high, a higher threshold value C2 corresponding to the predetermined level may be set, and when the luminance of the pixel of interest is relatively low, a lower threshold value C2 may be set. In this manner, even if a face is present at a low contrast (a state where the distribution of the pixel values is small) in a so-called dark area having low luminance values, the face can be correctly normalized.

It is assumed here that the inclination of the face to be detected is one of twelve inclination types that are set by rotating the face within the plane of the image subjected to detection S0 by an increment of 30 degrees from the vertical direction of the image subjected to detection S0, and a switching order of the inclinations of the face to be detected has been determined in advance. For example, the switching order may be expressed by clockwise rotational angles from the vertical direction of the image subjected to detection S0, such that the upward orientation includes three directions of 0 degree, 330 degrees and 30 degrees (a 0-degree group), the rightward orientation includes three directions of 90 degrees, 60 degrees and 120 degrees (a 90-degree group), the leftward orientation includes three directions of 270 degrees, 240 degrees and 300 degrees (a 270-degree group), and the downward orientation includes three directions of 180 degrees, 150 degrees and 210 degrees (a 180-degree group), and the inclinations may be switched in this order.

The face detection unit 30 applies the face detection process to each resolution image S1'_m (m=1 to M) in the resolution image group S1' that has been normalized by the normalization unit 20, with changing the inclination of the face to be detected according to the preset order, to detect face images S2 (hereinafter unspecified face images are designated by S2) contained in all the resolution images. The face detection unit 30 is formed by a plurality of components.

As shown in FIG. 1, the face detection unit 30 includes a resolution image selection unit 31, a sub-window setting unit 32 (corresponding to a partial image cutting means of the invention), a classifier group 33 (corresponding to a first indicator value calculating means or a face image candidate extracting means of the invention), a candidate group setting unit 34 (corresponding to a candidate group setting means of the invention), an integrated score calculation unit 35 (corresponding to a second indicator value calculating means of the invention), and a face image extraction unit 36 (corresponding to a face image extracting means of the invention).

The resolution image selection unit 31 selects each resolution image in the resolution image group S1' generated by the multiple resolution image generating unit 20 in the order of the image size from the smallest, i.e., from the one having the roughest resolution, for the face detection process. It should be noted that the technique used for the face detection in this embodiment detects a face in the image subjected to detection S0 by determining, for each of partial images W which are sequentially cut out from the resolution images and having the same size, whether or not the partial image W is the face image. Therefore, it can be regarded that the resolution image selection unit 31 sets the resolution images in such an order that the relative size of the partial image W to the image subjected to detection S0, i.e., the size of the face to be detected in the image subjected to detection S0, changes from the largest to the smallest.

The sub-window setting unit 32 sets a sub-window for cutting out each partial image W, on which the determination as to whether or not it is the face image is to be made, from the resolution image selected by the resolution image selection unit 31 with shifting the position of the sub-window by a predetermined pitch for each time.

For example, the sub-window for cutting out the partial images W having a predetermined size (i.e., 32×32 pixel size) is set on the selected resolution image, with being shifted by a predetermined number of pixels (for example, two pixels) to the next positions, and the cut out partial images W are sequentially inputted to the classifier group 33. As described later, each classifier forming the classifier group 33 discriminates face images containing faces having predetermined inclination and orientation. This allows discrimination of face images containing faces having any inclination and orientation.

The classifier group 33 calculates for each partial image W, based on the image pattern of the partial image W, a score (indicator value) sc that indicates a probability of the partial image W being the face image containing a face having the predetermined inclination and orientation, with changing the predetermined inclination and orientation to obtain the scores sc for the respective inclinations and orientations. Then, if the partial image W has a calculated score sc that is not less than the first threshold value Th1, the classifier group 33 extracts the partial image W as a candidate D for the face image that contains a face having the predetermined inclination and orientation indicated by the calculated score that is not less than the first threshold value Th1.

Figure 6:
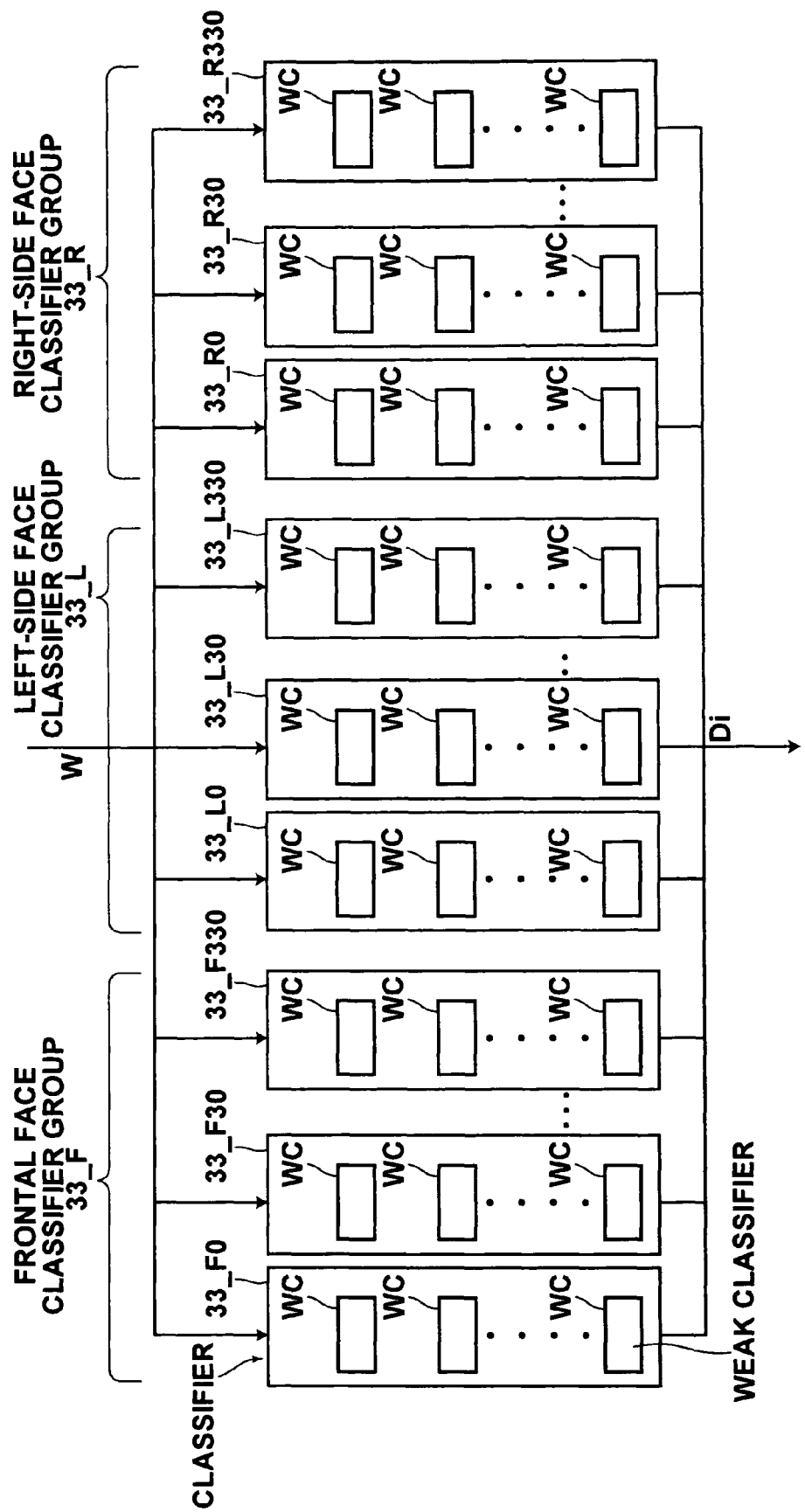
FIG. 6 is a block diagram illustrating the configuration of a classifier group.

FIG. 6 illustrates the configuration of the classifier group 33. As shown in FIG. 6, the classifier group 33 is formed by multiple types of classifier groups respectively corresponding to different orientations of the faces to be discriminated, i.e., a frontal face classifier group 33_F for mainly discriminating frontal faces, a left-side face classifier group 33_L for mainly discriminating left-side faces, and a right-side face classifier group 33_R for mainly discriminating right-side faces, which are connected in parallel. Further, each of the three types of classifier groups contains multiple classifiers. Each classifier discriminates faces having an inclination corresponding to one of twelve directions at intervals of 30 degrees from the vertical direction of the image. Namely, the frontal face classifier group 33_F includes classifiers 33_F0, 33_F30, ..., and 33_F330, the left-side face classifier group 33_L includes classifiers 33_L0, 33_L30, ..., and 33_L330, and the right-side face classifier group 33_R includes classifiers 33_R0, 33_R30, ..., and 33_R330.

As shown in FIG. 6, each of the classifiers contains multiple weak classifiers WC. Each weak classifier WC calculates at least one feature quantity relating to a distribution of pixel values of the partial image W, and the calculated feature quantity is used to calculate a score scw that indicates a probability of the partial image W being the face image containing a face having the predetermined inclination and orientation.

It should be noted that, although the main orientations of faces that can be discriminated by the classifier group 33 are the three orientations including the frontal face, the left-side face and the right-side face, the classifier group 33 may include additional classifiers that respectively discriminate right-front and left-front oriented faces to improve accuracy in detection of faces having such oblique orientations.

Now, the configuration of each classifier forming the classifier group 33, the flow of operations in the classifier and the learning process for the classifier will be described.

Each classifier contains the multiple weak classifiers WC that have been selected, through the later-described learning process, from a lot of weak classifiers WC as being effective for the discrimination. Each weak classifier WC calculates a feature quantity from the partial image W according to a predetermined algorithm that is unique to the weak classifier WC, and obtains the score scw that indicates a probability of the partial image W being the face image containing a face having the predetermined inclination and orientation, based on the feature quantity and a histogram of the weak classifier itself (described later) that serves as a predetermined score table. The classifier sums up the scores scw obtained by the weak classifiers WC to obtain the score sc, and then extracts the partial image W having the score sc not less than the threshold value Th1 as a candidate D for the face image S2 containing a face having the predetermined inclination and orientation.

Figure 7:
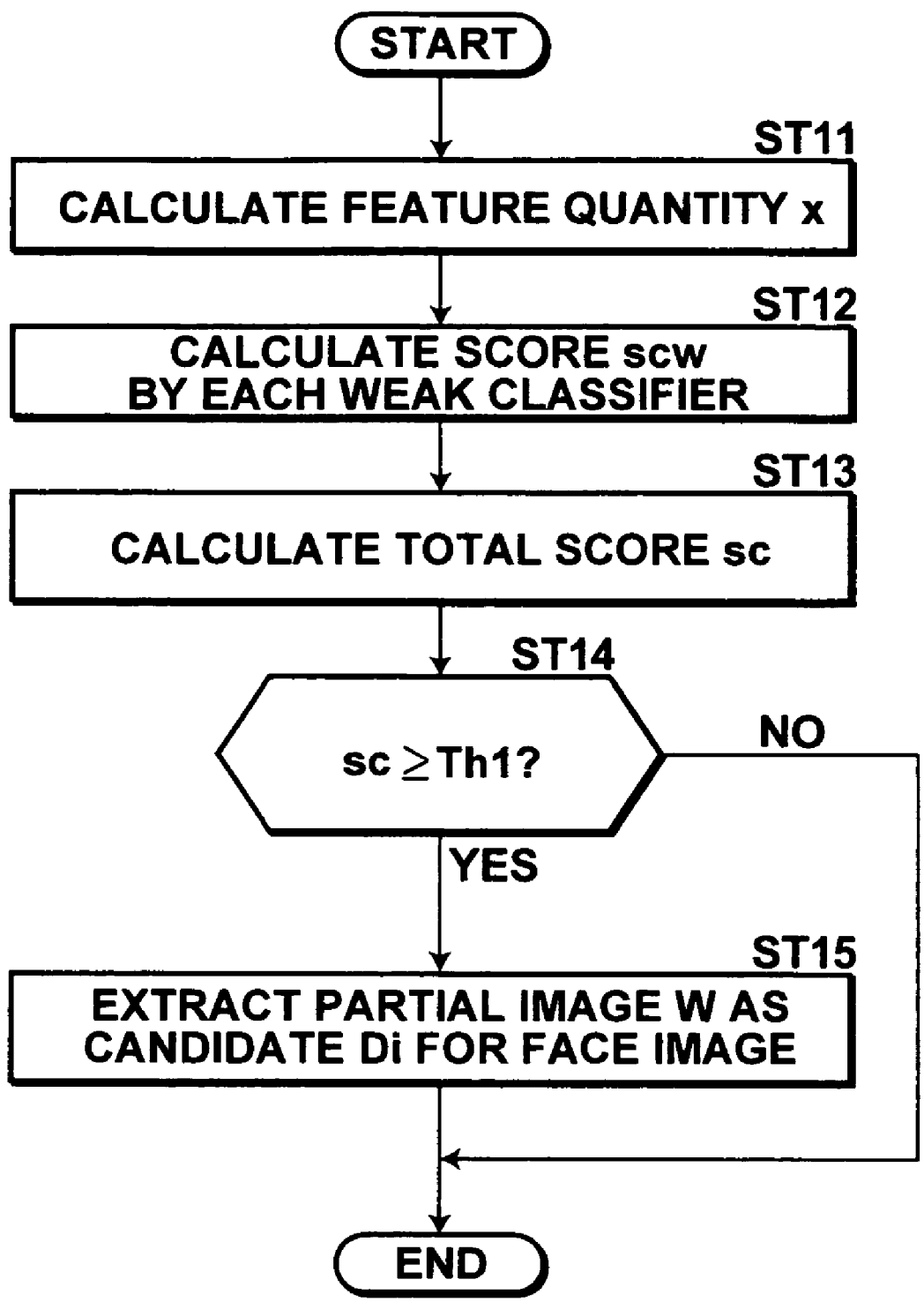
FIG. 7 is a flow chart of a process at a classifier.
Figure 8:
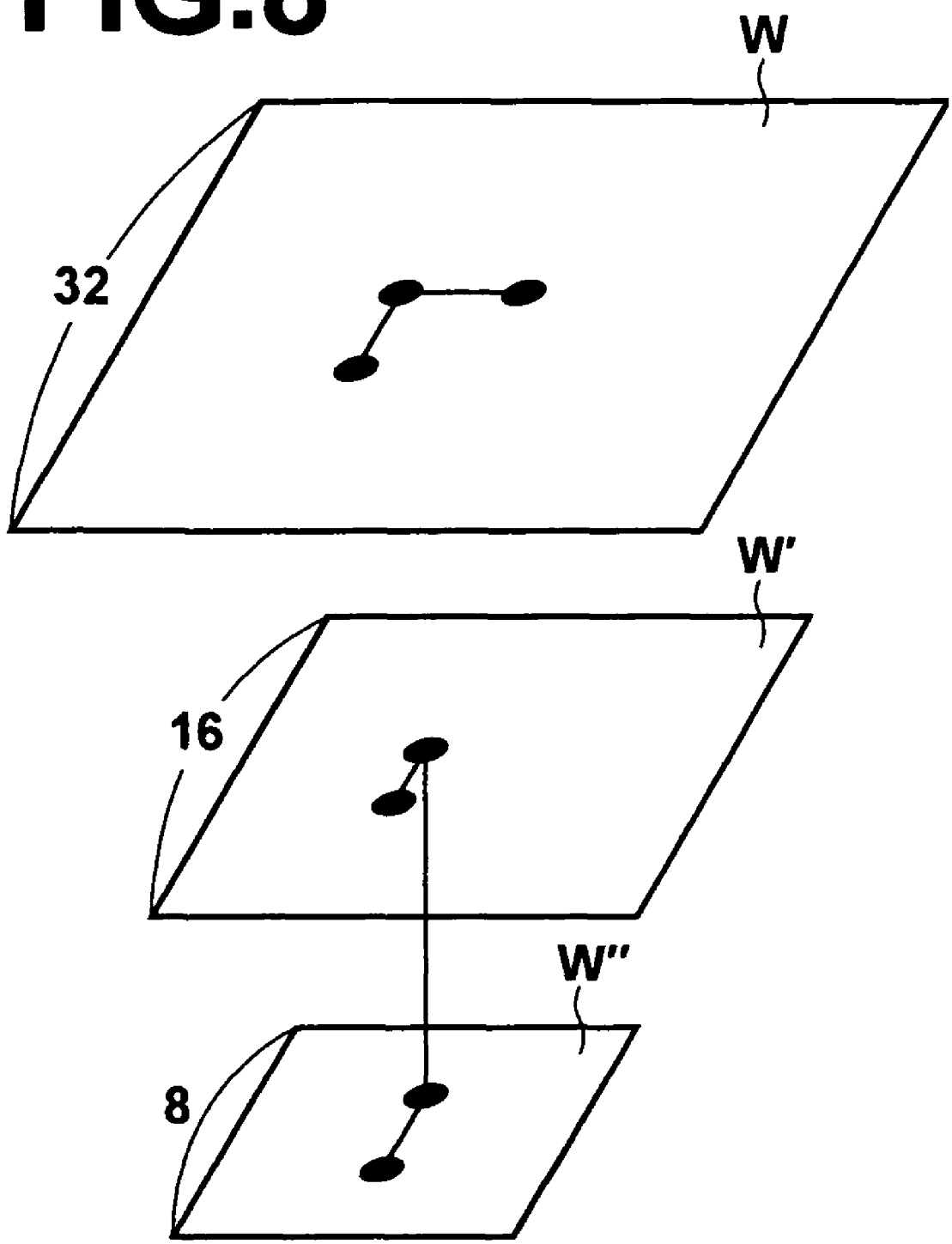
FIG. 8 is a diagram for explaining calculation of a feature quantity at a weak classifier.

FIG. 7 is a flow chart illustrating the flow of a process carried out at one classifier. As the partial image W is inputted to the classifier, the weak classifiers WC respectively calculate feature quantities x that are different from each other (step ST11). For example, as shown in FIG. 8, 4-neighbor pixel averaging (a process that divides an image into blocks each having a 2×2 pixel size, and assigns an average value of four pixels in each block to one pixel corresponding to the block as the pixel value thereof) is applied in a phased manner to the partial image W having the predetermined size (for example, 32×32 pixel size) to obtain an image W' having a reduced pixel size of 16×16 pixels and an image W" having a reduced pixel size of 8×8 pixels. Then, a group of pairs of predetermined points, which are set in the planes of these three images W, W' and W" is formed, and a difference between the pixel (luminance) values of the two points of each pair is calculated. A combination of these differences of the pairs forming the group is used as the feature quantity of the partial image. The predetermined two points of each pair may be, for example, predetermined two points along the longitudinal direction or the transverse direction of the image, which are determined to reflect the feature with respect to the contrasting density of the face in the image. Then, a value x corresponding to the combination of the differences is calculated as the feature quantity. Subsequently, each weak classifier calculates the score scw, which indicates the probability of the partial image W being the face image containing the face to be discriminated (for example, in the case of the classifier 33_F30, "a face having the frontal orientation and the inclination of the rotational angle of 30 degrees"), based on the value x and the predetermined score table (the histogram of the weak classifier itself) (step ST12). Then, the scores scw calculated by the respective weak classifiers are summed up to obtain the score sc (step ST13). Then, whether or not the score sc is less than the first threshold value Th1 is determined (step ST14). If it is determined that the score sc is not less than the first threshold value Th1, the partial image W is extracted as a candidate Di (i=1, 2, ... ) for the face image S2 containing the face having the predetermined inclination and orientation to be discriminated by this classifier (step ST15).

Next, a learning process for (process of generating) the classifier is described.

Figure 9:
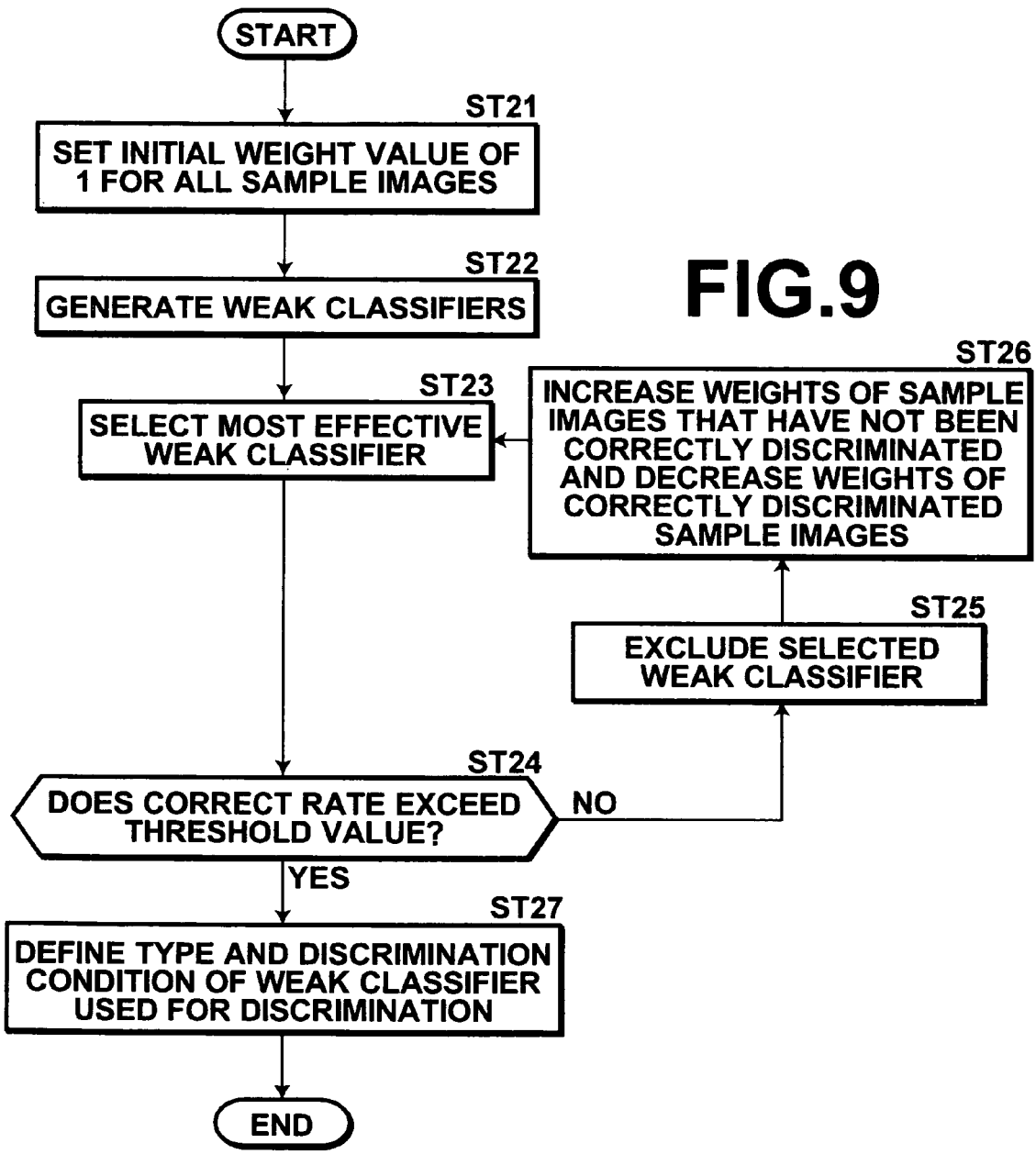
FIG. 9 is a flow chart of a learning process for the classifier.

FIG. 9 is a flow chart illustrating the learning process for the classifier. For the learning by the classifier, sample images are used, which have been standardized to have a predetermined size (for example, 32×32 pixel size) and further subjected to processing similar to the normalization processing by the normalization unit 20. As the sample images, different face sample images which are known to be face images (a face sample image group) and different non-face sample images which are known not to be face images (a non-face sample image group) are prepared.

Figure 10:
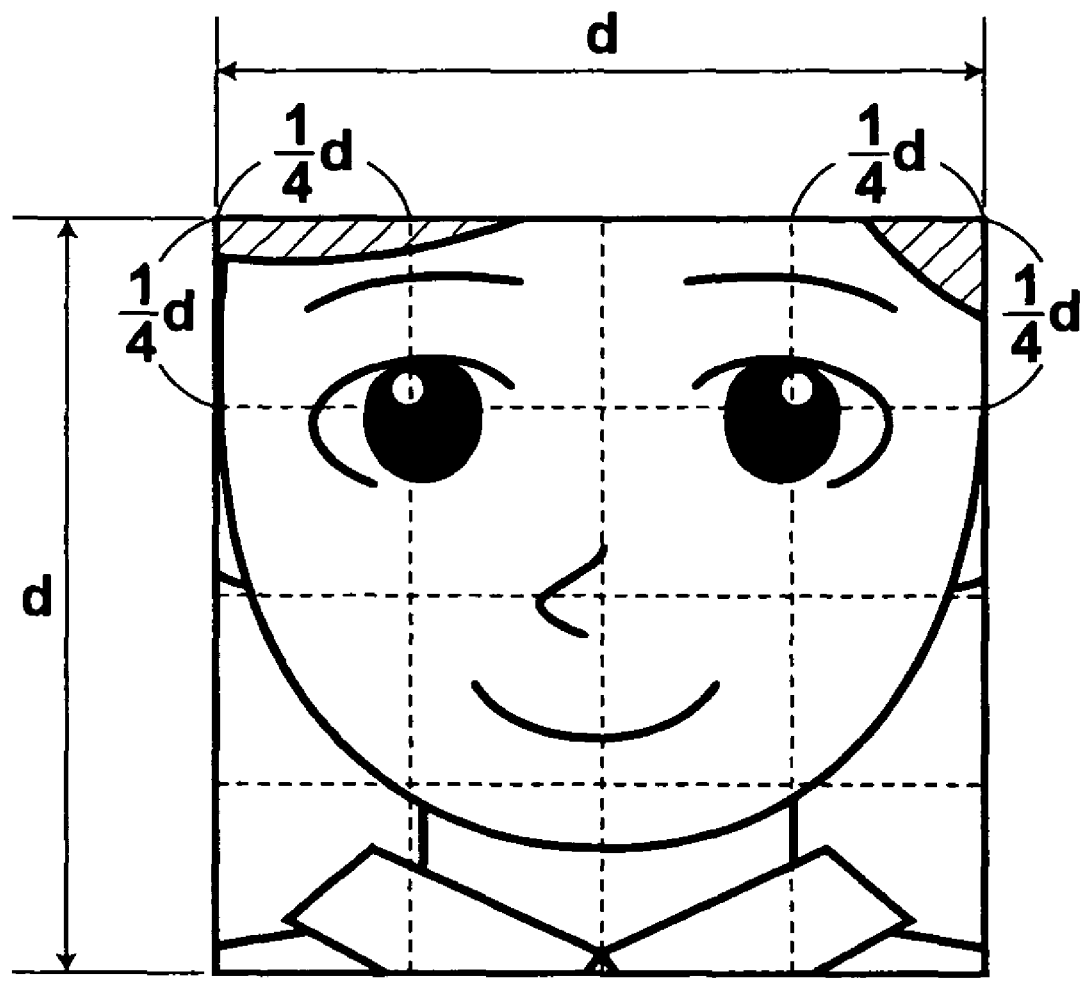
FIG. 10 illustrates a sample face image that has been standardized so that eyes are positioned at predetermined positions.

The face sample image group contains multiple variations of one face sample image, which are obtained by scaling the longitudinal and/or transverse dimensions of the face sample image in a phased manner within a range from 0.7 to 1.2 times by an increment (decrement) of 0.1, and then rotating the scaled sample images in a phased manner within a range of ±15 degrees on the image plane by an increment of three degrees. It should be noted that the sizes and the positions of the faces contained in the face sample images are standardized so that the eye(s) is positioned at a predetermined position(s). Then, the above-described rotation on the image plane and scaling are carried out with the position(s) of the eye(s) being the reference point. For example, in a case of a sample image having a d×d size, as shown in FIG. 10, the size and the position of the face is standardized so that the eyes are positioned at points inward by a distance of ¼ d and downward by a distance ¼ d from the upper left apex and the upper right apex of the sample image, respectively. The rotation on the image plane and scaling are carried out with the midpoint between the eyes being the center.

Each of these sample images is assigned with a weight, i.e., an importance. First, the initial weight value of 1 is assigned for all the sample images (step ST21).

Next, the groups of pairs of the predetermined points set within the planes of the sample image and the reduced images thereof are set, and a weak classifier is produced for each group of pairs (step ST22). Each weak classifier provides criteria for discrimination between the face image and the non-face image using a combination of differences between pixel (luminance) values of the two points in each pair forming the group of pairs of the predetermined points set in the planes of the partial image cut out within the sub-window W and reduced images thereof. In this embodiment, a histogram about the combination of differences between pixel values of the two points in each pair forming the group of pairs is used as a basis for the score table for the weak classifier.

Figure 11:
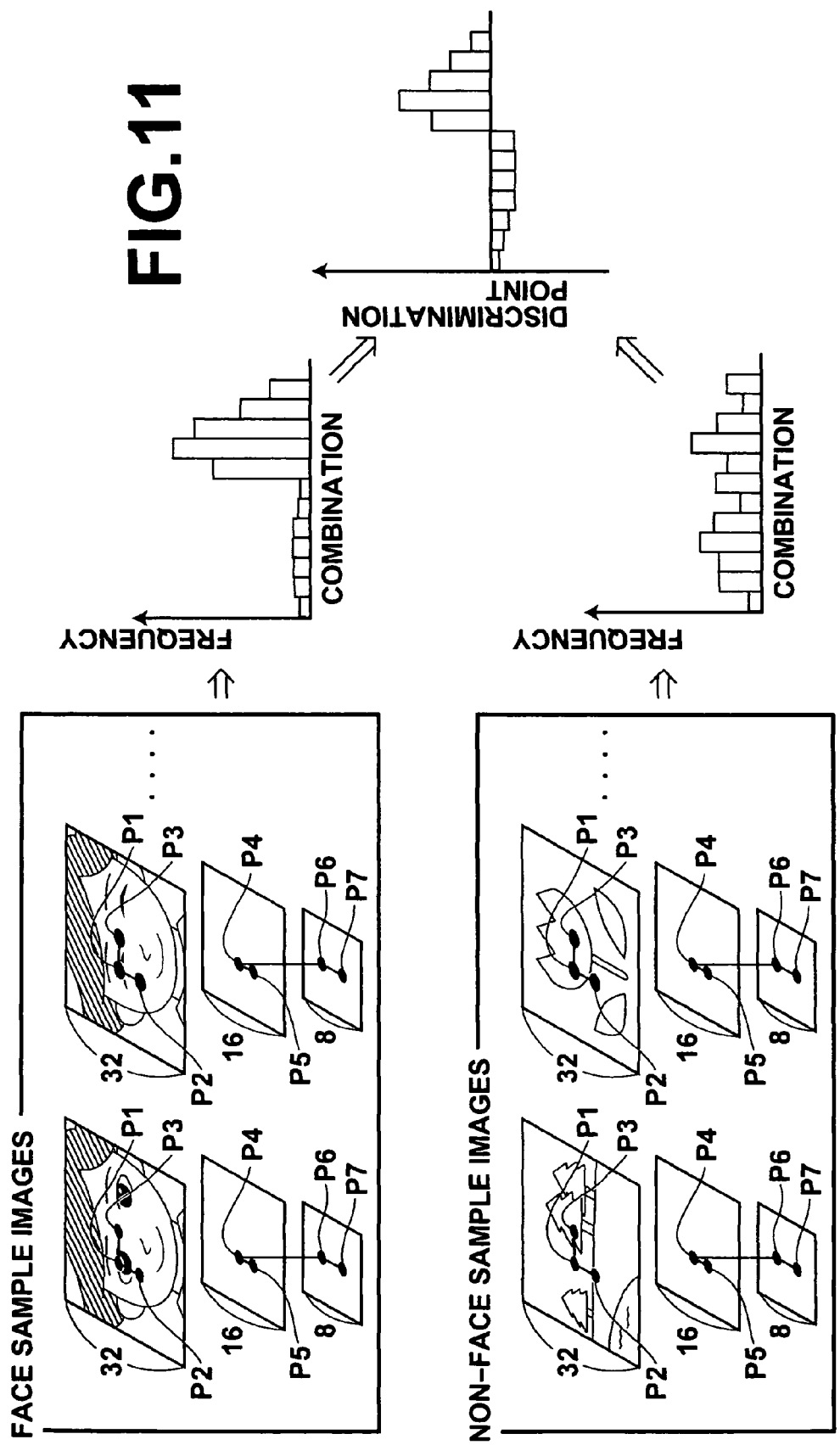
FIG. 11 illustrates how a histogram of the weak classifier is derived.

FIG. 11 illustrates how the histogram is generated from the sample images. As shown by the sample images on the left side of FIG. 11, the pairs of points forming the group of pairs for producing the classifier are five pairs of points P1 and P2, P1 and P3, P4 and P5, P4 and P6, and P6 and P7 in the face sample images. The point P1 is at the center of the right eye, the point P2 is at the right cheek and the point P3 is between the eyebrows in the sample image; the point P4 is at the center of the right eye and the point P5 is at the right cheek in the 16×16 pixel size reduced image obtained by reducing the sample image using the 4-neighbor pixel averaging; and the point P6 is at the forehead and the point P7 is at the mouth in the 8×8 pixel size reduced image obtained by reducing the 16×16 pixel size reduced image using the 4-neighbor pixel averaging. It should be noted that the coordinates of two points in each pair forming a group of pairs for producing a certain classifier are common to all the sample images. Then, for each of the face sample images, the combination of the differences between pixel values of the points of the respective pairs of the five pairs is obtained, and a histogram about the combination is generated. Note that values that may be taken as the combination of the differences between the pixel values vary depending on the number of levels in the luminance scale of the image. In the case of a 16 bit luminance scale, for example, there are 65,536 different values for a difference between a pair of pixel values, and therefore, as a whole (for the five pairs), the number of the values is "the number of levels in the scale" raised to the power of "the number of pairs", i.e. 65,536 raised to the power of 5. This would necessitate vast amounts of samples, time and memory for the learning and detection. Therefore, in this embodiment, the differences between the pixel values are quantized at intervals of a suitable numerical value to render them into n-values (n=100, for example). As a result, the number of the combinations of the differences between the pixel values becomes $n^5$, and thus the number of data representing the combination of the differences between the pixel values can be reduced.

Similarly, the histogram is generated for the non-face sample image group. It should be noted that, for the non-face sample images, points P1 to P7 corresponding to the pairs of the predetermined points on the face sample images (designated by the same reference numerals) are used. The histogram shown at the rightmost side of FIG. 11 plots logarithmic values of ratios of frequency values shown in these two histograms for the face and non-face sample image groups, and is used as the basis for the score table for the weak classifier. Hereinafter, the values along the vertical axis of the histogram of the weak classifier are referred to as discrimination points. According to this weak classifier, an image having a distribution of the combination of differences between pixel values corresponding to positive discrimination points has a high possibility of being a face, and the possibility is higher if the absolute values of the discrimination points are greater. In contrast, an image having a distribution of the combination of differences between pixel values corresponding to negative discrimination points has a high possibility of not being a face, and the possibility is higher if the absolute values of the discrimination points are greater. In step ST22, the weak classifier having a form of the above-described histogram is generated for each combination of the differences between the pixel values at the predetermined points in each pair forming the groups of pairs that may be used for discrimination.

Subsequently, from the weak classifiers generated in step ST22, a weak classifier which is the most effective for the determination as to whether or not the image is the face image is selected. The selection of the most effective weak classifier is carried out with consideration to the weight of each sample image. In this example, weighted correct rates of the weak classifiers are compared to each other, and a weak classifier showing the highest weighted correct rate is selected (step ST23). Namely, in the step ST23 for the first time, all the sample images have the same weight of 1, and therefore, simply, a weak classifier that has made correct discrimination on the highest number of sample images is selected as the most effective weak classifier. On the other hand, in step ST23 carried out for the second time after the weights of the sample images have been updated in the previous step ST26 (described later), there are sample images having the weight of 1, sample images having the weight greater than 1, and sample images having the weight less than 1 present in mixture. Therefore, in the evaluation of the correct rate, the sample images having the weight greater than 1 are counted more than the sample images having the weight of 1. Thus, in step ST23 for the second time and later, the selection of the most effective weak classifier is carried out with a focus on that the weak classifier can correctly discriminate the sample images having large weights rather than the sample images having small weights.

Then, a correct rate of the combination of the weak classifiers selected so far (i.e., a rate of the results of the discrimination carried out by the combination of the weak classifiers selected so far corresponding to the actual correct answer) is found, and whether or not the correct rate exceeds a predetermined threshold value is checked (in the learning stage, the weak classifiers are not necessarily connected linearly) (step ST24). For the evaluation of the correct rate of the combination of the weak classifiers, the sample image groups with current weights or the sample image groups with equal weights may be used. If the correct rate exceeds the predetermined threshold value, then the discrimination of the image being the face image can be achieved with high probability using the weak classifiers selected so far, and therefore the learning process ends. If the correct rate does not exceed the predetermined threshold value, the process proceeds to step ST25 to select additional weak classifiers to be used in combination with the weak classifiers selected so far.

In step ST25, the weak classifier selected in the previous step ST23 are excluded so as not to be selected again.

Then, the weights of the sample images, which have not been correctly discriminated as to whether or not they are the face images by the weak classifier selected in the previous step ST23, are increased, and the weights of the sample images which have been correctly discriminated are decreased (step ST26). The reason for changing the weights in this manner is to put weight on the images which have not been correctly discriminated by the already selected weak classifier so that another weak classifier that can perform correct discrimination on these images is selected, thereby improving effect of combining the weak classifiers.

Then, the process returns to step ST23, where the next effective weak classifier is selected based on the weighted correct rate, as described above.

The above-described steps ST23 to ST26 are repeated. When a weak classifier corresponding to the combination of the differences between the pixel values of the predetermined points in the respective pairs forming a certain group of pairs has been selected as the weak classifier suitable for the discrimination of the face images, and if the correct rate checked in step ST24 has exceeded the threshold value, then the type and the discrimination condition of the weak classifier used for the discrimination are defined (step ST27), and the learning process ends. The selected weak classifiers are coupled linearly in the order of the weighted correct rates from the highest to the lowest to form one classifier. For each weak classifier, a score table for calculating a score according to the combination of the differences between the pixel values is generated based on the obtained histogram. It should be noted that the histogram itself can be used as the score table, and in this case, the discrimination points in the histogram are used as the scores.

In this manner, the classifier is generated through the learning process using the face sample image group and the non-face sample image group. As described above, in order to generate different classifiers corresponding to different inclinations and orientations of the faces to be discriminated, face sample image groups corresponding to the respective inclinations and orientations of faces are prepared, and the learning process is carried out for each face sample image group using the face sample image group and the non-face sample image group.

Namely, in this embodiment, three types of orientations including frontal, left side and right side orientations, and twelve types of inclinations including rotational angles from 0 degree to 330 degrees at intervals of 30 degrees are defined for faces, and therefore a total of 36 types of face sample image groups are prepared.

As the face sample image groups have been prepared, the above-described learning process is carried out for each type of the face sample image group using the face sample image group and the non-face sample image group, thereby generating the classifiers forming the classifier group 33.

Using the multiple classifiers, each of which has learned the corresponding orientation and inclination of the face, face images containing various inclinations and orientations of faces can be discriminated.

It should be noted that, when the above-described learning process is employed, the weak classifier may be in any form other than the histogram as long as it provides criteria for discrimination between the face images and the non-face images using the combination of differences between the pixel values of the predetermined points in the pairs forming a specific group of pairs, such as a form of binary data, a threshold value or a function. Further, the weak classifier may be in a form of a histogram showing the distribution of the differences between the two histograms shown at the center of FIG. 11.

The learning process is not limited to the above-described process, and other machine learning techniques such as a neural network may be used.

The candidate group setting unit 34 sets one of the candidates Di (i=1 to N; N is the number of the extracted candidates) extracted by the classifier group 33 as a candidate of interest. When any nearby candidate(s), whose coordinate distance from the candidate of interest is not more than a predetermined distance, is present in the candidates other than the candidate of interest, the candidate of interest and the nearby candidate(s) are set in one candidate group.

Namely, assuming that the classifier group 33 has extracted N candidates, a candidate of interest is represented by Di and a candidate(s) to be compared is represented by Dj (j=1 to N), then the candidate(s) Dj having a coordinate distance dist (i, j) from the candidate of interest Di not more than a predetermined distance $\delta_{ij}$ (j ∈ dist (i, j) $\leq \delta_{ij}$, including the case of i=j) is set in one candidate group DGi together with the candidate of interest. Then, each of the candidates is sequentially set as the candidate of interest, and a candidate group is set for each time. It should be noted that the distance dist (i, j) can be defined as expressed by equation (3) shown below:

$$\text{dist}(i,j) = \sqrt{(x_i - x_j)^2 + (y_i - y_j)^2} \quad (3)$$

wherein $x_i$ and $y_i$ represent a coordinate at the center of the candidate Di and $x_j$ and $y_j$ represent a coordinate at the center of the candidate Dj.

The predetermined distance $\delta_{ij}$ can be determined with taking the respective image sizes (scales of the extracted images) of the candidates Di and Dj into account. Considering the scales of the extracted images is equal to considering the resolution of the extracted images. The reason is as follows.

The face detection is carried out using a fixed size as a unit. Therefore, as described above, in order to detect faces having various sizes, it is necessary to prepare images having various resolutions. In order to restore candidates extracted from the images having various resolutions to images having the original resolution, their scales will respectively be converted according to the resolutions of the respective images from which they are extracted. Therefore, even if a distance between center positions of certain two candidates Di and Dj is the same, the size of the face may differ due to the resolution of the image from which they are extracted. Therefore, there are cases where the candidates Di and Dj should be considered as different faces and where the candidates Di and Dj should be considered as the same face.

Figure 12:
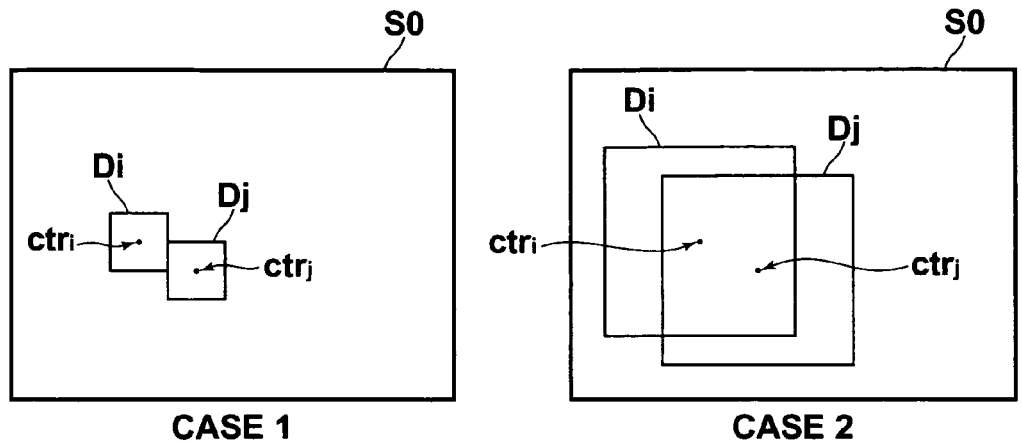
FIG. 12 illustrates two cases for two candidates having the same distance between the center positions thereof, but having different relative distances to the size of the face.

FIG. 12 illustrates two cases where the distance between the center positions of the two candidates Di and Dj is the same in both cases, but the size of the extracted candidate image, i.e., the size of the face is different. As can be seen from FIG. 12, even when the distance between the center positions of the candidates Di and Dj is the same, if the distance is relatively large with respect to the size of the face, the candidates Di and Dj should be determined to be different faces (case 1 shown at the left side of FIG. 12). In contrast, if the distance is relatively small with respect to the size of the face, the candidates Di and Dj should be determined to be the same face (case 2 shown at the right side of FIG. 12).

Accordingly, it is preferable to adjust the predetermined distance $\delta_{ij}$ such that the larger the size of at least one of the candidate of interest Di and the other candidate Dj (j=1 to N, j≠i), the larger the predetermined distance $\delta_{ij}$. The predetermined distance $\delta_{ij}$ can be defined, for example, by equation (4) shown below:

$$\delta_{ij} = c_1 Sl_i + c_2 Sl_j \quad (4)$$

wherein each of $c_1$ and $c_2$ is a constant, and each of $Sl_i$ and $Sl_j$ is a scale conversion parameter determined according to the resolution of a resolution image from which each of the candidates Di and Dj is extracted.

The integrated score calculation unit 35 calculates, for each candidate group Di set by the candidate group setting unit 34, an integrated score (integrated indicator value) $SC_i$ based on the scores $sc_j$ (j ∈ dist (i, j)≦$\delta_{ij}$) calculated for the candidates forming the candidate group DGi, i.e., candidates Dj (j ∈ dist (i, j)≦$\delta_{ij}$). The integrated score reflects magnitudes of the scores $sc_j$ (j ∈ dist (i, j)≦$\delta_{ij}$). Here, the integrated score $SC_i$ is defined as a sum of the scores $sc_j$ (j ∈ dist (i,j)≦$\delta_{ij}$), as expressed by equation (5) shown below:

$$SC_i = \sum_{j \in dist(i,j) < \delta_{ij}} sc_j. \quad (5)$$

When the integrated score $SC_i$ calculated by the integrated score calculation unit 35 is not less than a second threshold value Th2, the face image extraction unit 36 extracts, as a face image S2, an image within a predetermined area in the image subjected to detection S0 that contains the candidate group DGi, for which the integrated score $SC_i$ has been calculated. A method for extracting the face image S2, i.e., a method for estimating the position and the size of the face image may be as follows.

Figure 13:
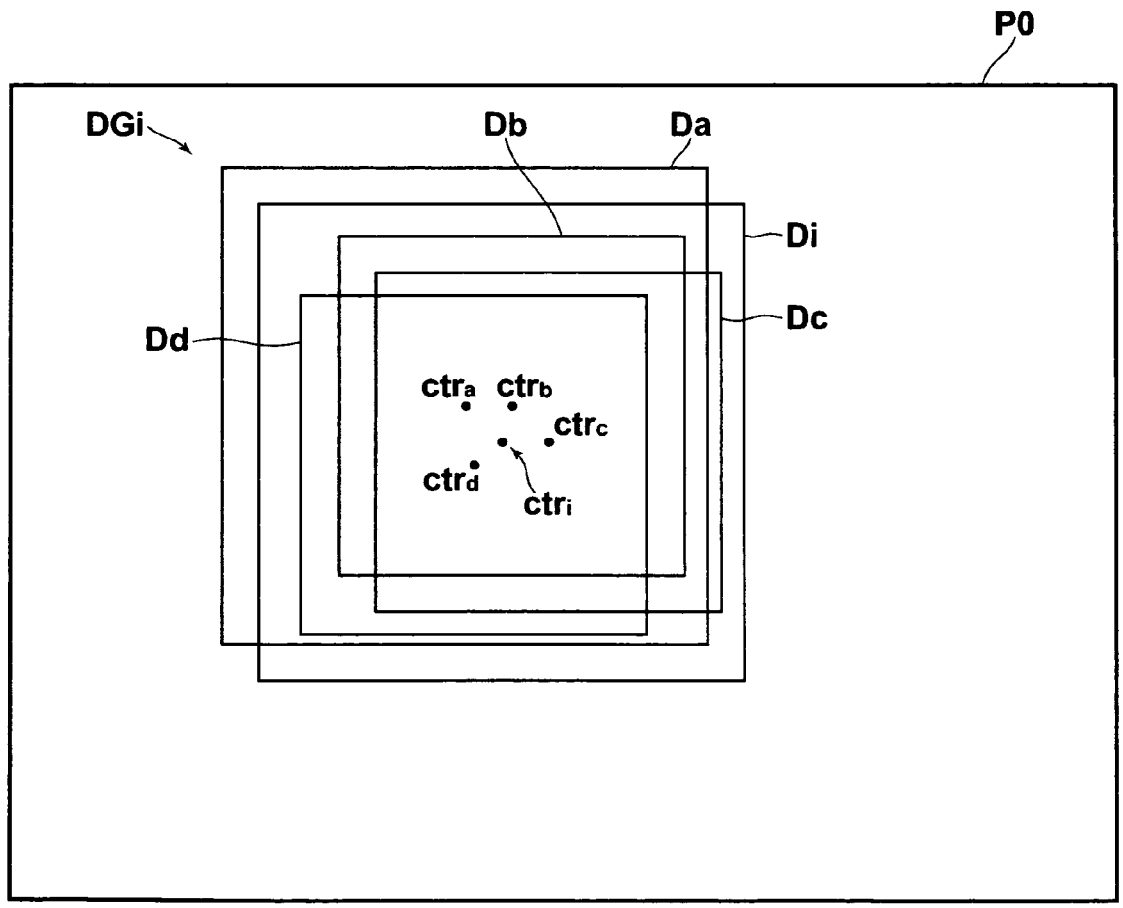
FIG. 13 illustrates an example of candidates forming one candidate group.

For example, among the candidates in the candidate group DGi, a candidate having the largest score $sc_j$ may be adopted. FIG. 13 shows the candidate Di and other candidates Da, Db, Dc and Dd forming the candidate group DGi. In this case, the position coordinate of the face image is estimated to be a position coordinate of a candidate having the largest score among the candidates Di, Da, Db, Dc and Dd, and the size of the face image is estimated to be the image size of the candidate.

Alternatively, for example, the position coordinate of the face image is estimated to be a weighted average (weighted according to the scores) of position coordinates of the candidates Di, Da, Db, Dc and Dd forming the candidate group DGi, and the size of the face image is estimated to be a weighted average (weighted according to the scores) of the sizes of the candidates Di, Da, Db, Dc and Dd (it is assumed herein that the partial image is square and the size is represented by the length of one side of the face image). Namely, the position coordinate $X_{det}$, $Y_{det}$ of the face image and the length of one side of the face image $d_{det}$ are found using equations (6), (7) and (8) shown below:

$$x_{det} = \frac{\sum_{j \in dist(i,j) < \delta_{ij}} sc_j x_j}{SC_i} \quad (6)$$

$$y_{det} = \frac{\sum_{j \in dist(i,j) < \delta_{ij}} sc_j y_j}{SC_i} \quad (7)$$

$$d_{det} = \frac{\sum_{j \in dist(i,j) < \delta_{ij}} sc_j d_j}{SC_i} \quad (8)$$

wherein $SC_i$ represents a total sum (equation 5) of the scores of the candidates Di, Da, Db, Dc and Dd forming the candidate group DGi. In this manner, even if there is a candidate that happens to have a high score, influence of such an accidental score on the estimated position coordinate and size of the face image can be reduced. In this embodiment, the latter method is used to estimate the position coordinate and the size of the face image.

The overlapping detection determining unit 40 determines, for each face image S2 detected in the resolution images, whether or not the face image S2 is a face image representing the same face in the image subjected to detection S0 and has been detected overlappingly in the resolution images having adjacent resolution levels, based on positional relationships between the face images. Then, the overlapping detection determining unit 40 integrates the face images that have been determined as being detected overlappingly into one and output true face images S3 without overlapping detection.

When the image subjected to detection S0 is subjected to the multiple resolution conversion to obtain multiple resolution images, a resolution gap between the resolution images having adjacent resolution levels cannot be large in order to prevent the occurrence of any undetected face image through the detection. Usually, the classifiers have a certain degree of allowable range for the discriminable size of faces. In this case, the same face in the image subjected to detection S0 may be detected overlappingly in the resolution images having adjacent resolution levels. Such overlapping detection can be compensated to a certain degree by the candidate group setting unit 34 integrating nearby face image candidates into one candidate group. However, when the predetermined distance $\delta_{ij}$ is set relatively small, the overlapping detection cannot be compensated completely, and face images corresponding to the same face may be detected overlappingly. The above-described processing by the overlapping detection determining unit 40 is carried out to eliminate such uncompensated overlapping detection to obtain the accurate result of the detection.

Next, the flow of the process carried out in the face detection system 1 according to the first embodiment will be described.

Figure 14A:
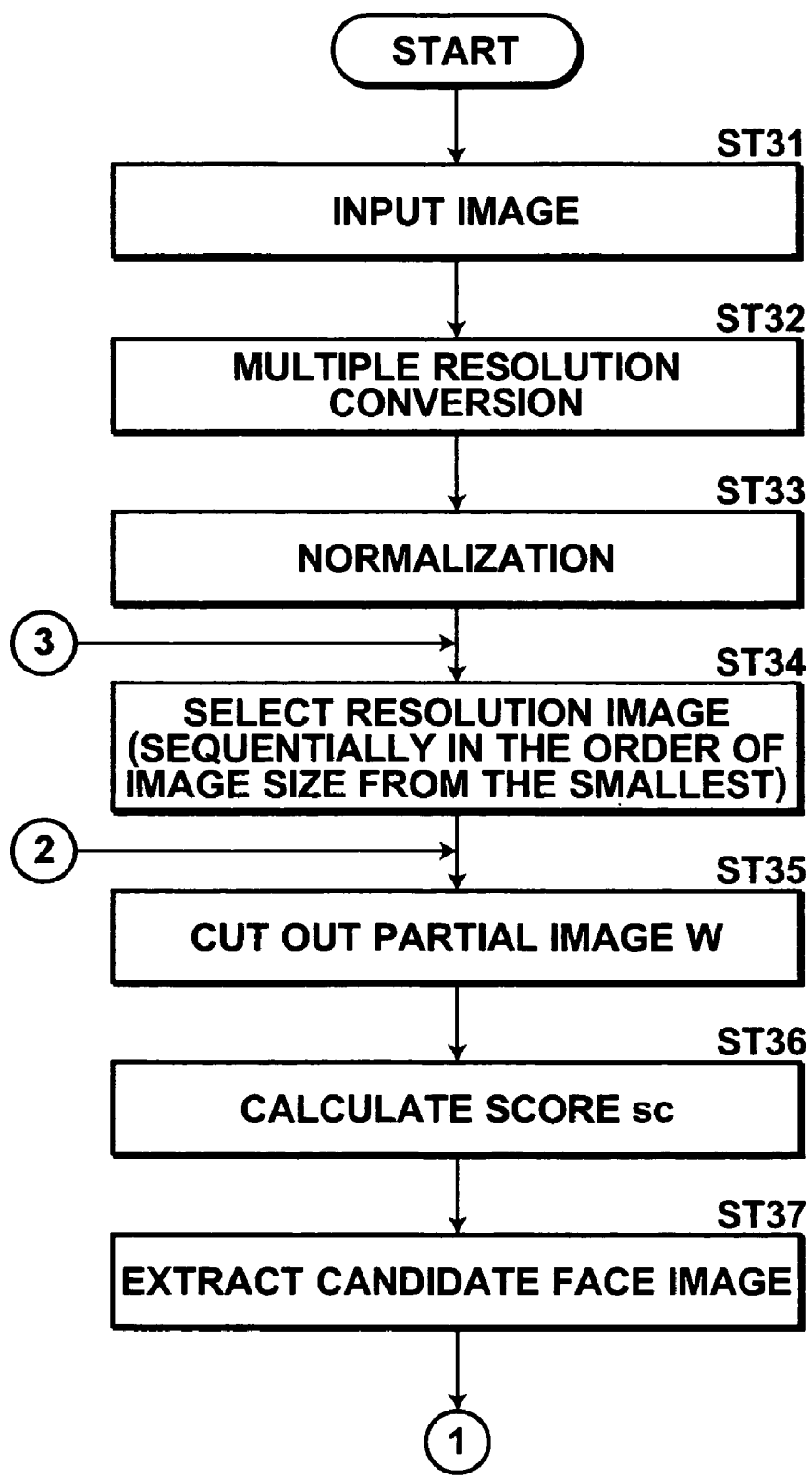
FIG. 14A is a flow chart of the former part of a process in the face detection system according to the first embodiment.
Figure 14B:
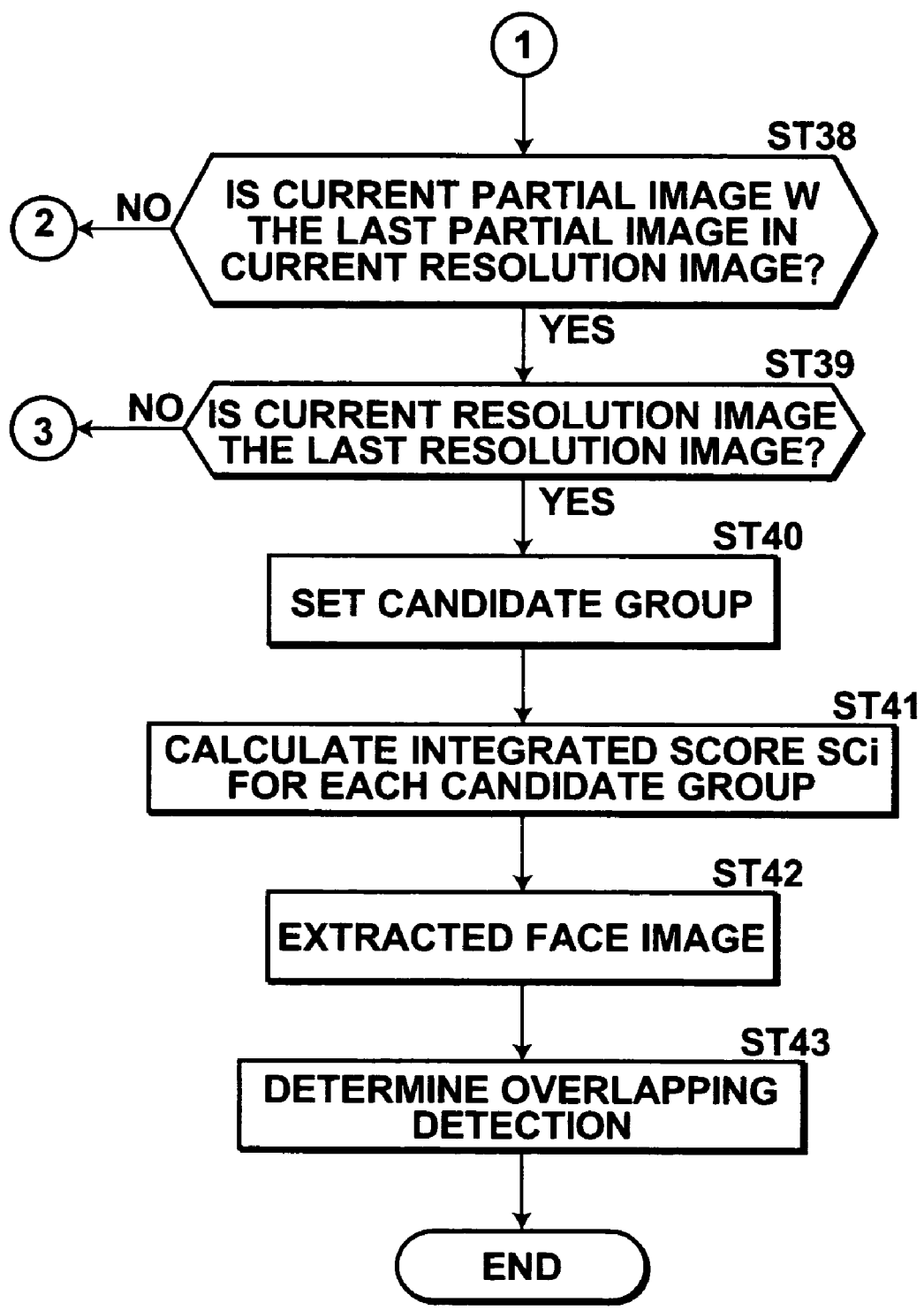
FIG. 14B is a flow chart of the latter part of the process in the face detection system according to the first embodiment.

A flow chart of the process in the face detection system 1 according to the first embodiment is shown in FIGS. 14A and 14B. As shown in FIGS. 14A and 14B, as the image subjected to detection S0 is supplied to the present system (step ST31), the multiple resolution image generating unit 10 generates the image S0' by converting the image size of the image subjected to detection S0 into a predetermined size, and further generates the resolution images forming the resolution image group S1 by reducing the size (resolution) of the image S0' by a decrement of $2^{-1/3}$ times, and repeating this size reduction on the reduced image obtained by the previous size reduction (step ST32). Then, the normalization unit 20 applies the above-described global normalization processing and local normalization processing to the resolution images of the resolution image group S1 to obtain the normalized resolution image group S1' (step ST33).

Subsequently, the resolution image selection unit 31 within the face detection unit 30 selects one of the resolution images S1'_m of the resolution image group S1' in the order of the image size from the smallest, i.e., in the order of S1'_M, S1'_M-1, . . . , and S1'_1 (step ST34). The sub-window setting unit 32 sets the sub-window on the selected resolution image S1'_m, with shifting the sub-window at a predetermined pitch (for example, an interval of two pixels) to the next positions (in the subsequent repetitions) to sequentially cut out the partial images W having a predetermined size (one partial image W in one repetition) (step ST35), and inputs the partial image W to the classifier group 33. Each classifier forming the classifier group 33 uses the multiple weak classifiers to calculate the score sc that indicates a probability of the inputted partial image W being the face image containing a face having the predetermined inclination and orientation (step ST36), and extracts the partial image W that has the calculated score sc not less than the first threshold value Th1 as a candidate for the face image (step ST37).

The sub-window setting unit 32 determines whether or not the current partial image W is the last partial image in the current resolution image (step ST38). If it is determined that the current partial image W is not the last partial image, the process returns to step ST35 to continue the operations of cutting out a new partial image W in the current resolution image and extracting a candidate for the face image. On the other hand, if it is determined that the current partial image W is the last partial image, the resolution image selection unit 31 determines whether or not the current resolution image is the last resolution image (step ST39). If it is determined that the current resolution image is not the last resolution image, the process returns to step ST34 to select a new resolution image, and continues the operations for extracting a candidate for the face image. On the other hand, if it is determined that the current resolution image is the last resolution image, the operations for extracting the candidates for the face image ends, and the process proceeds to the next step.

As the classifier group 33 has extracted N candidates, as described above, the candidate group setting unit 34 sets a candidate group DGi formed by a candidate of interest Di (i=any of 1 to N) and any candidate(s) Dj among candidates to be compared Dj (j=1 to N), whose coordinate distance dist (i, j) from the candidate of interest Di is not more than the predetermined distance $\delta_{ij}$ (j ∈ dist (i, j)≦$\delta_{ij}$, including the case of i=j). The candidate group setting unit 34 sets each of the candidates as the candidate of interest, and a candidate group is set for each time (step ST40). The distance dist (i, j) between the candidate of interest and the candidate to be compared and the predetermined distance $\delta_{ij}$ are defined by the above-described equations (3) and (4), and the image size of each candidate (the size of the face) is taken into account.

When all the candidate groups DGi have been set, the integrated score calculation unit 35 calculates, for each candidate group DGi, a total sum of the scores $sc_j$ (j ∈ dist (i, j)≦$\delta_{ij}$) calculated for the candidates forming the candidate group DGi, i.e., the candidates Dj (j ∈ dist (i, j)≦$\delta_{ij}$), and outputs the total sum as the integrated score $SC_i$ for the candidate group DGi (step ST41).

Then, the face image extraction unit 36 determines, for each candidate group DGi, whether or not the integrated score $SC_i$ is less than the second threshold value Th2. If the integrated score $SC_i$ is not less than the second threshold value Th2, then the position coordinate of the face image is estimated to be a weighted average (weighted according to the scores) of the position coordinates of the candidates forming the candidate group DGi for which the integrated score $SC_i$ has been calculated, the size of the face image (the length of one side of the image) is estimated to be a weighted average (weighted according to the scores) of the sizes (the lengths of one sides of the images) of the images forming the candidate group DGi, and a partial image having the center at the estimated position coordinate and the estimated size is extracted as the face image S2 (step ST42).

When all the face images S2 have been extracted, the overlapping detection determining unit 40 determines, for each face image S2 detected in the resolution images S1'_m, whether or not the face image S2 is the face image representing the same face in the image subjected to detection S0 and has been detected overlappingly in the resolution images having adjacent resolution levels, based on positional relationships between the face images. Then, the overlapping detection determining unit 40 integrates the face images that have been determined as being detected overlappingly into one to output the true face images S3 without overlapping detection (step ST43).

Figure 15:
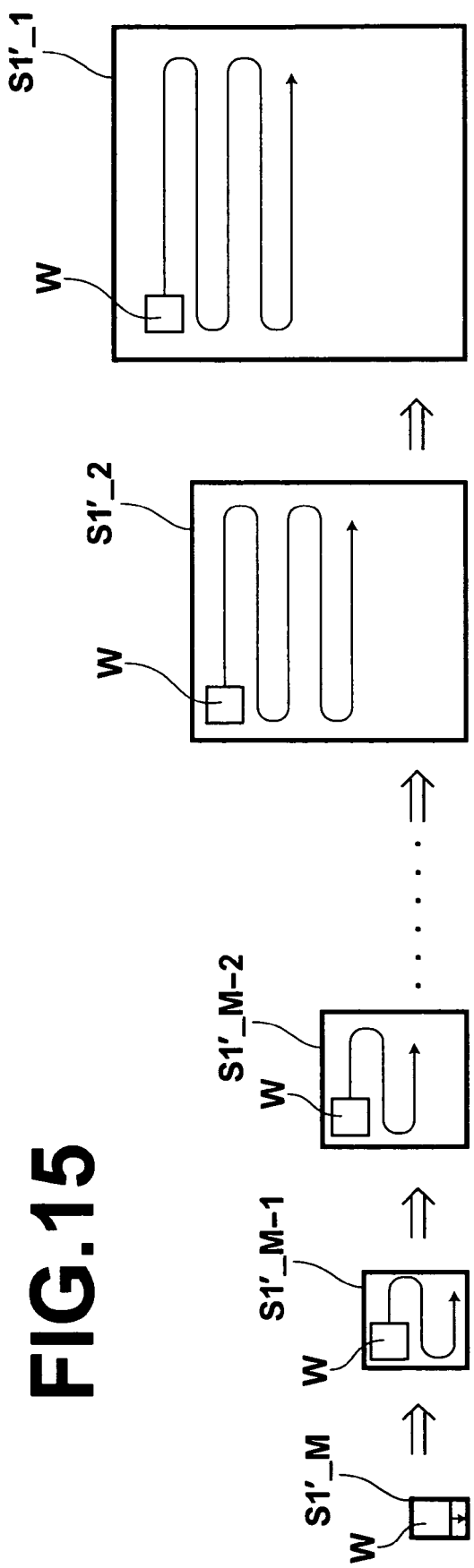
FIG. 15 is a diagram for explaining switching of resolution images subject to face detection and shifting of a sub-window on the images.

FIG. 15 illustrates how each of the resolution images are selected in the order of the size from the smallest and the partial images W are sequentially cut out from the respective resolution images S1'_m for face detection, by repeating the above-described steps ST34 to ST39.

The face detection system, which is the first embodiment of the face detection device according to the invention, detects face images contained in inputted images subjected to detection. In this system, the partial images having a predetermined size are cut out at different positions in the image subjected to detection. Then, the indicator value that indicates a probability of the partial image being the face image is calculated for each of the partial images cut out at different positions, and all the partial images that have the calculated indicator values not less than the first threshold value are extracted as the candidates for the face image. Then, each candidate is set as the candidate of interest, and if any nearby candidate(s), whose coordinate distance from the candidate of interest is not more than the predetermined distance, is present in the candidates other than the candidate of interest, then the candidate of interest and the nearby candidate(s) are set in one candidate group. Then, for each candidate group, the integrated indicator value, which reflects the magnitudes of the indicator values, is calculated based on the indicator values calculated for the candidates forming the candidate group. If the integrated indicator value is not less than the second threshold value, then an image within a predetermined area in the image subjected to detection containing the candidate group, for which the integrated indicator value is calculated, is extracted as the face image.

According to the face detection system as described above, only when a condition that relatively high indicator values are calculated in a locally concentrated manner, which is characteristic to true face images, is satisfied, the partial images having the relatively high indicator values are determined to be the images corresponding to the same face, and the face image is extracted from the neighborhood of these partial images. Therefore, even if a non-face image pattern that happens to raise the indicator value is contained in a cut out partial image, such a non-face partial image can be excluded from the objects for the face image detection, thereby reducing false detection.

Next, an embodiment of a second aspect of the face detection device according to the invention (a second embodiment) will be described. The face detection system according to the second embodiment is based on the first aspect of the face detection device according to the invention, wherein the range of images subjected to the detection is extended to time-series images, and a concept of proximity in time is added to the determination of whether or not relatively high scores are calculated in a locally concentrated manner.

Similarly to the first embodiment, the face detection system according to the second embodiment includes the multiple resolution image generating unit 10, the normalization unit 20, the face detection unit 30 and the overlapping detection determining unit 40, and the face detection unit 30 includes the resolution image selection unit 31, the sub-window setting unit 32 (the partial image cutting means), the classifier group 33 (the first indicator value calculating means, the face image candidate extracting means), the candidate group setting unit 34 (the candidate group setting means), the integrated score calculation unit 35 (the second indicator value calculating means) and the face image extraction unit 36 (the face image extracting means), as shown in FIG. 1. However, the operations performed at the sub-units forming the face detection unit 30 are slightly different from those in the first embodiment, as described below.

The multiple resolution image generating unit 10 applies multiple resolution conversion to each of inputted time-series images S0_1 to S0_K (K represents the number of time-series images) taken at predetermined time intervals, for example, a series of frame images taken with a digital movie camera, to obtain resolution images S1_11 to S1_1M, S1_21 to S1_2M, ..., and S1_K1 to S1_KM.

The normalization unit 20 applies normalization, which is similar to the normalization in the first embodiment, to all the resolution images obtained through the multiple resolution conversion and obtains normalized resolution images S1'_11 to S1'_1M, S1'_21 to S1'_2M, ..., and S1'_K1 to S1'_KM.

The resolution image selection unit 31 selects, for each time-series image S0_k (k=1 to K), corresponding resolution images S1'_km (m=1 to M) one by one.

The sub-window setting unit 32 cuts out the partial images W having a predetermined size at different positions in the selected resolution image S1'_km.

The classifier group 33 calculates, for each of the partial images W cut out at the different positions in the resolution image S1'_km, a score sc that indicates a probability of the partial image W being the face image, and extracts the partial image W having the calculated score sc not less than the first threshold value Th1 as a candidate D for the face image.

The candidate group setting unit 34 sets one of the extracted candidate as a candidate of interest, and if any nearby candidate(s), whose coordinate distance from the candidate of interest is not more than the predetermined distance and which is contained in a time-series image that was taken at a time within a predetermined range from the time when the time-series image containing the candidate of interest was taken, is present in the candidates other than the candidate of interest, then sets the candidate of interest and the nearby candidate(s) in one candidate group.

Namely, assuming that the classifier group 33 has extracted N candidates, the candidate of interest is represented by Di (I=1 to N) and a candidate to be compared is represented by Dj (j=1 to N), then the candidate(s) Dj having a temporal-spatial Euclidean distance dist (i, j) from the candidate of interest Di not more than a predetermined distance $\delta_{ij}$ (j ∈ dist (i, j)≦$\delta_{ij}$, including the case of i=j) is set in one candidate group DGi together with the candidate of interest. Then, each of the candidates is sequentially set as the candidate of interest, and a candidate group is set for each time. It should be noted that the Euclidean distance dist (i, j) and the predetermined distance $\delta_{ij}$ can be defined as equations (9) and (10) shown below, respectively:

$$\text{dist}(i,j) = \sqrt{(x_i-x_j)^2 + (y_i-y_j)^2 + c(t_i-t_j)^2} \tag{9}$$

$$\delta_{ij} = c_1 Sl_i + c_2 Sl_j + c_3|t_i-t_j| \tag{10}$$

wherein $x_i$ and $y_i$ represent a coordinate at the center of the candidate Di, $x_j$ and $y_j$ represent a coordinate at the center of the candidate Dj, c3 is a constant, and $t_i$ and $t_j$ are times when the time-series images containing the candidates Di and Dj were taken, respectively.

The integrated score calculation unit 35 calculates, for each candidate group DGi set by the candidate group setting unit 34, a total sum of scores $sc_j$ (j ∈ dist (i, j)≦$\delta_{ij}$) calculated for the candidates forming the candidate group DGi, i.e., the candidates Dj (j ∈ dist (i, j)≦$\delta_{ij}$), as the integrated score $SC_i$.

When the integrated score $SC_i$ calculated by the integrated score calculation unit 35 is not less than the second threshold value Th2, the face image extraction unit 36 extracts, as a face image S2, an image within a predetermined area containing the candidate in at least one time-series image of all the time-series images containing any of the candidates forming the candidate group DGi, for which the integrated score $SC_i$ has been calculated. It should be noted that, in this embodiment, the face image S2 within the predetermined area containing the candidate is extracted from each of the time-series images containing any of the candidates forming the candidate group DGi.

Figure 16:
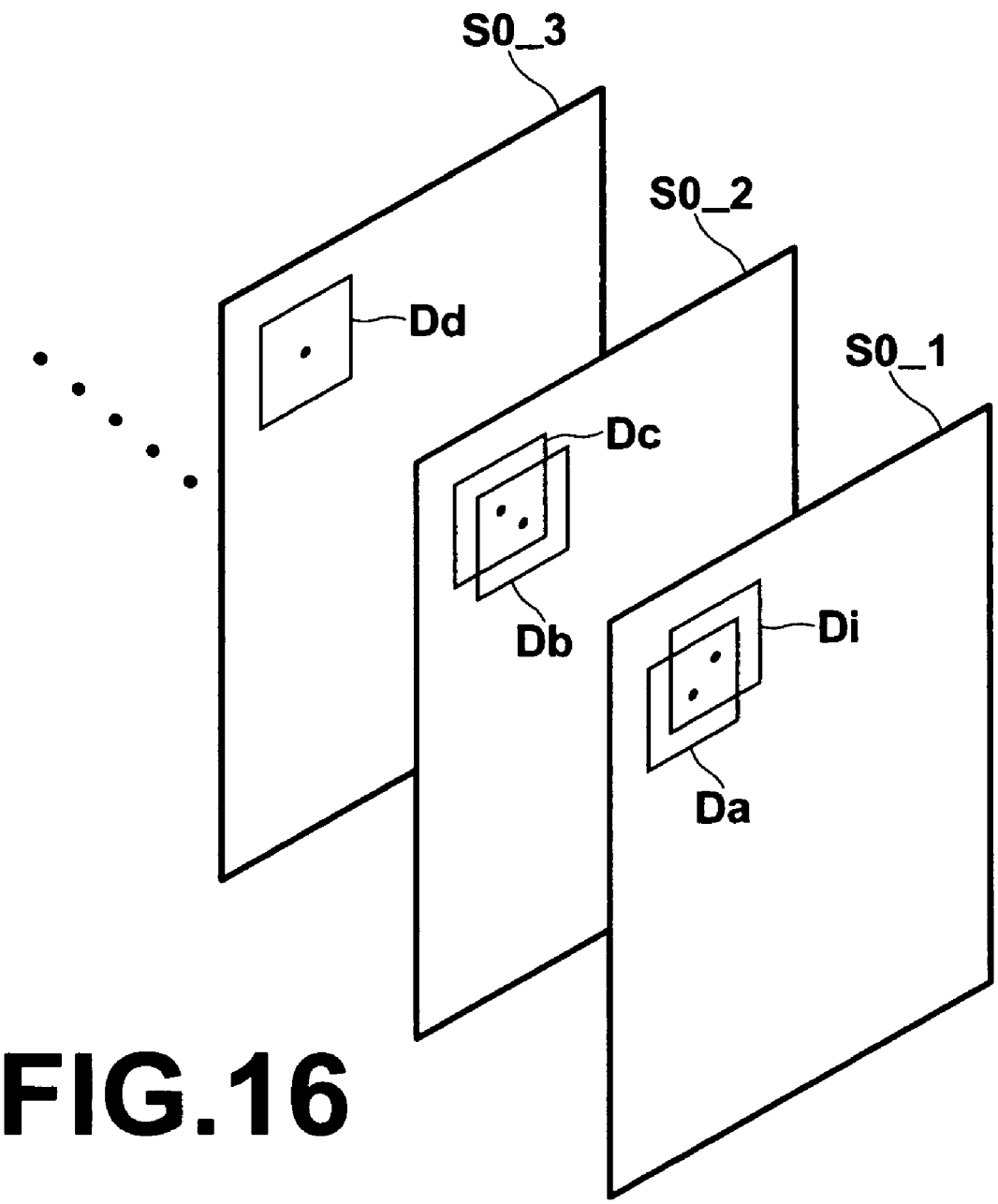
FIG. 16 illustrates an example of candidates forming one candidate group in time-series images.

FIG. 16 illustrates a state in which candidates Di, Da, Db, Dc and Dd form a candidate group DGi, and the candidates Di and Da are contained in the time-series image S0_1, the candidates Db and Dc are contained in the time-series image S0_2, and the candidate Dd is contained in the time-series image S0_3.

For example, in the case shown in FIG. 16, the position coordinate of the face image S2 in the time-series image S0_1 is estimated as a weighted average (weighted according to the scores) of position coordinates of the candidates Di and Da, and the size of the face image S2 in the time-series image S0_1 is estimated as a weighted average (weighted according to the scores) of image sizes of the candidates Di and Da, to extract the face image S2. Similarly, the position coordinate and the size of the face image S2 in the time-series image S0_2 are estimated as weighted averages of those values of the candidates Db and Dc, to extract the face image S2. Since the time-series image S0_3 contains only the candidate Dd, the candidate Dd itself is extracted as the face image S2.

The overlapping detection determining unit 40 determines, for each face image S2 detected in each resolution image S1'_km of each of the time-series images S0_k in which the face image S2 has been detected, whether or not the face image represents the same face in the time-series image S0_k and has been detected overlappingly in the resolution images having adjacent resolution levels, based on the positional relationships between the face images. Then, the overlapping detection determining unit 40 integrates the face images that have been determined as being detected overlappingly into one and output true face images S3 without overlapping detection.

Next, the flow of a process carried out in the face detection system according to the second embodiment will be described.

Figure 17A:
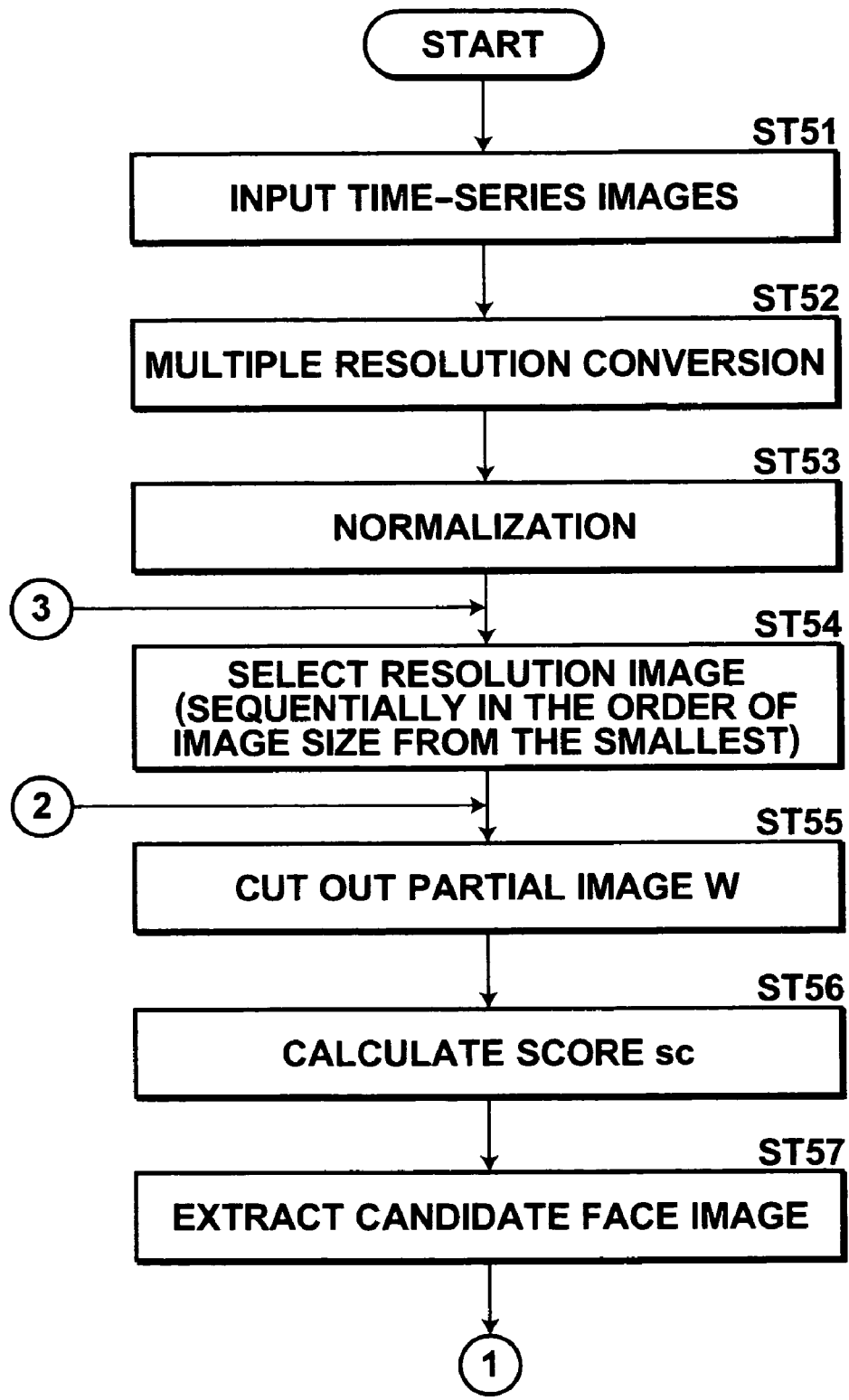
FIG. 17A is a flow chart of the former part of a process in the face detection system according to the second embodiment.

A flow chart of the process in the face detection system according to the second embodiment is shown in FIGS. 17A and 17B. As shown in FIGS. 17A and 17B, as the time-series images S0_1 to S0_K, which are the images subjected to detection, have been supplied to the present system (step ST51), the multiple resolution image generating unit 10 generates, for each time-series image S0_k, the image S0'_k having the image size converted into a predetermined size, and further generates the resolution images S1_k1 to S1_kM forming the resolution image group S1_k by reducing the size (resolution) of the image S0'_k by a decrement of $2^{-1/3}$ times, and repeating this size reduction on the reduced image obtained by the previous size reduction (step ST52). Then, the normalization unit 20 applies the above-described global normalization processing and local normalization processing to the resolution images S1_11 to S1_KM in all the resolution image groups S1_1 to S1_K to obtain the normalized resolution image groups S1'_11 to S1'_KM (step ST53).

Subsequently, the resolution image selection unit 31 within the face detection unit 30 selects, for each resolution image group S1'_k, one of the resolution images S1'_k1 to S1'_kM in the order of the image size from the smallest, i.e., in the order of S1'_kM, S1'_k (M−1) . . . , and S1'_k1 (step ST54). The sub-window setting unit 32 sets sub-window on the selected resolution image S1'_km, with shifting the sub-window at a predetermined pitch (for example, an interval of two pixels) to the next positions (in the subsequent repetitions) to sequentially cut out the partial images W having a predetermined size (one partial image W for one repetition) (step ST55), and inputs the partial images W to the classifier group 33. Each classifier forming the classifier group 33 uses the multiple weak classifiers to calculate the score sc that indicates a probability of the inputted partial image W being the face image containing a face having the predetermined inclination and orientation (step ST56), and extracts the partial image W that has the calculated score sc not less than the first threshold value as a candidate for the face image (step ST57).

The sub-window setting unit 32 determines whether or not the current partial image W is the last partial image in the current resolution image (step ST58). If it is determined that the current partial image W is not the last partial image, the process returns to step ST55 to continue the operations of cutting out a new partial image W in the current resolution image and extracting a candidate for the face image. On the other hand, if it is determined that the current partial image W is the last partial image, the resolution image selection unit 31 determines whether or not the current resolution image is the last resolution image (step ST59). If it is determined that the current resolution image is not the last resolution image, the process returns to step ST54 to select a new resolution image, and continues the operations for extracting a candidate for the face image. On the other hand, if it is determined that the current resolution image is the last resolution image, the operations for extracting the candidates for the face image ends, and the process proceeds to the next step.

As the classifier group 33 has extracted N candidates, as described above, the candidate group setting unit 34 sets a candidate group DGi formed by a candidate of interest Di (i=any of 1 to N) and any candidate(s) Dj among candidates to be compared Dj (j=1 to N), whose Euclidean distance dist (i, j) in the time space from the candidate of interest Di is not more than the predetermined distance $\delta_{ij}$ (j ∈ dist (i, j)≦$\delta_{ij}$, including the case of i=j). The candidate group setting unit 34 sequentially sets each of the candidates as the candidate of interest, and a candidate group is set for each time (step ST60). The Euclidean distance dist (i, j) between the candidate of interest and the candidate to be compared and the predetermined distance $\delta_{ij}$ are defined by the above-described equations (9) and (10), and the image size (the size of the face) and the time at which the image containing each candidate is taken are taken into account.

When all the candidate groups DGi have been set, the integrated score calculation unit 35 calculates, for each candidate group DGi, a total sum of scores $sc_j$ (j ∈ dist (i, j)≦$\delta_{ij}$) calculated for the candidates forming the candidate group DGi, i.e., the candidates Dj (j ∈ dist (i, j)≦$\delta_{ij}$), and outputs the total sum as the integrated score $SC_i$ for the candidate group DGi (step ST61).

Subsequently, the face image extraction unit 36 determines, for each candidate group DGi, whether or not the integrated score $SC_i$ is less than the second threshold value Th2. If the integrated score $SC_i$ is not less than the second threshold value Th2, then, for a specific time-series image, i.e., for each of the time-series images S0_r (r=12, . . . ) containing any of the candidates forming the candidate group DGi for which the integrated score $SC_i$ has been calculated, a partial image is extracted as the face image S2, whose estimated center position coordinate in the time-series image S0_r being a weighted average (weighted according to the scores) of position coordinates of the candidates contained in the time-series image S0_r, and whose estimated size (the length of one side of the image) in the time-series image S0_r being a weighted average (weighted according to the scores) of image sizes (the lengths of one sides of the images) of the candidates contained in the time-series image S0_r (step ST62).

When all the face images S2 have been extracted, the overlapping detection determining unit 40 determines, for each face image S2 detected in the resolution images of each time-series image S0_r, whether or not the face image S2 represents the same face in the time-series image S0_r and has been detected overlappingly in the resolution images having adjacent resolution levels, based on positional relationships between the face images. Then, the overlapping detection determining unit 40 integrates the face images that have been determined as being detected overlappingly into one to output the true face images S3 without overlapping detection (step ST63).

The face detection system, which is the second embodiment of the face detection device according to the invention, detects face images contained in time-series images taken at a predetermined time interval. In this system, the partial images having a predetermined size are cut out at different positions in each time-series image. Then, for each of the partial images cut out at different positions in each time-series image, the indicator value indicating a probability of the partial image being the face image is calculated, and all the partial images that have the calculated indicator values not less than the first threshold value are extracted as the candidates for the face image. Then, each candidate is set as the candidate of interest, and if any nearby candidate(s), whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, then, the candidate of interest and the nearby candidate(s) are set in one candidate group. Then, for each candidate group, the integrated indicator value, which reflects the magnitudes of the indicator values, is calculated based on the indicator values calculated for the candidates forming the candidate group. If the integrated indicator value is not less than the second threshold value, then an image within a predetermined area containing the candidate in at least one of the time-series images containing any of the candidates forming the candidate group, for which the integrated indicator value has been calculated, is extracted as the face image.

According to the face detection system as described above, information about time is utilized, and only when a condition that relatively high indicator values are calculated in a locally concentrated manner in the spatial and temporal directions, which is characteristic to true face images contained in successive time-series images, is satisfied, the partial images having the relatively high indicator values are determined to be the images corresponding to the same face, and the face image is extracted from the neighborhood of these partial images. Therefore, even if a non-face image pattern that happens to raise the indicator value is contained in a cut out partial image in time-series images, such as successive frame images of a digital movie, such a non-face partial image can be excluded from the objects for the face image detection, thereby reducing false detection.

It should be noted that the face detection system according to the second embodiment can be utilized in a digital camera or the like, to continuously focus the position of the detected face, or to adjust white balance based on the color information of the detected face in a almost real-time manner, for example. Although the time-series images are naturally frame images taken in the past, almost real-time control of the camera can be achieved if the face detection process can be carried out at high speeds.

Further, although the classifier group 33 extracts, as the candidates for the face image, the partial images having the calculated scores not less than the first threshold value to extract only the partial images that have a certain degree of probability of being the candidates for the face image, in the first and second embodiments, the first threshold value Th1 may be set to a minimum value that may be taken by the score. This is equivalent to extracting all the partial images as the candidates for the face image, and results in a huge amount of processing necessary for extracting the candidates for the face image. This may impair the high-speed processing ability, however, since more candidates for the face image are extracted, face detection with higher accuracy can be expected. Generally, the first threshold value Th1 is set with considering a balance between the high-speed processing ability and the accuracy.

Furthermore, although the distance dist (i, j), which indicates proximity between the candidates for the face image, in the first and second embodiment includes the concepts of position and/or time, the distance dist (i, j) may further include the concepts of inclination (a rotational position) and/or orientation (an orientation in a range of directions from left to right) of the face. Namely, when a difference in inclination and/or orientation of the face between the candidate of interest and the candidate to be compared is within a predetermined angle (for example, an angle of 30 degrees), the candidate to be compared may be regarded as a nearby candidate of the candidate of interest and may be set in one candidate group together with the candidate of interest.

The face detection system according to the embodiments of the invention has been described. The embodiments of the invention also include a program for causing a computer to carry out the processes carried out at the units of the face detection system corresponding to the face detection device of the invention. The embodiments of the invention also include a computer readable storage medium that stores the program.

The face detection method, device and program according to the first aspect of the invention detects face images contained in inputted images subjected to detection. In this system, the partial images having a predetermined size are cutout at different positions in the image subjected to detection. Then, the indicator value that indicates a probability of the partial image being the face image is calculated for each of the partial images cut out at different positions, and all the partial images that have the calculated indicator values not less than the first threshold value are extracted as the candidates for the face image. Then, each candidate is set as the candidate of interest, and if any nearby candidate(s), whose coordinate distance from the candidate of interest is not more than the predetermined distance, is present in the candidates other than the candidate of interest, then the candidate of interest and the nearby candidate(s) are set in one candidate group. Then, for each candidate group, the integrated indicator value, which reflects the magnitudes of the indicator values, is calculated based on the indicator values calculated for the candidates forming the candidate group. If the integrated indicator value is not less than the second threshold value, then an image within a predetermined area in the image subjected to detection containing the candidate group, for which the integrated indicator value is calculated, is extracted as the face image.

According to the face detection method, device and program of the first aspect, only when a condition that relatively high indicator values are calculated in a locally concentrated manner, which is characteristic to true face images, is satisfied, the partial images having the relatively high indicator values are determined to be the images corresponding to the same face, and the face image is extracted from the neighborhood of these partial images. Therefore, even if a non-face image pattern that happens to raise the indicator value is contained in a cut out partial image, such a non-face partial image can be excluded from the objects for the face image detection, thereby reducing false detection.

The face detection method, device and program according to the second aspect of the invention is based on the face detection method, device and program of the first aspect, wherein the range of images subjected to the detection is extended to time-series images, and the concept of proximity in time is added to the determination of whether or not relatively high scores are calculated in a locally concentrated manner.

Namely, the face detection method, device and program according to the second aspect of the invention detects face images contained in time-series images taken at a predetermined time interval. In this system, the partial images having a predetermined size are cut out at different positions in each time-series image. Then, for each of the partial images cut out at different positions in each time-series image, the indicator value indicating a probability of the partial image being the face image is calculated, and all the partial images that have the calculated indicator values not less than the first threshold value are extracted as the candidates for the face image. Then, each candidate is set as the candidate of interest, and if any nearby candidate(s), whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, then, the candidate of interest and the nearby candidate(s) are set in one candidate group. Then, for each candidate group, the integrated indicator value, which reflects the magnitudes of the indicator values, is calculated based on the indicator values calculated for the candidates forming the candidate group. If the integrated indicator value is not less than the second threshold value, then an image within a predetermined area containing the candidate in at least one of the time-series images containing any of the candidates forming the candidate group, for which the integrated indicator value has been calculated, is extracted as the face image.

According to the face detection method, device and program of the second aspect, information about the temporal direction is utilized, and only when a condition that relatively high indicator values are calculated in a locally concentrated manner in the spatial and temporal directions, which is characteristic to true face images contained in successive time-series images, is satisfied, the partial images having the relatively high indicator values are determined to be the images corresponding to the same face, and the face image is extracted from the neighborhood of these partial images Therefore, even if a non-face image pattern that happens to raise the indicator value is contained in a cut out partial image in time-series images, such as successive frame images of a digital movie, such a non-face partial image can be excluded from the objects for the face image detection, thereby reducing false detection.

What is claimed is:

1. A face detection method for detecting a face image contained in an inputted image, the method comprising the steps of:
   cutting out partial images having a predetermined size at different positions in the inputted image;
   calculating, for each of the partial images cut out at the different positions, an indicator value indicating a probability of the partial image being the face image;
   extracting all the partial images having the calculated indicator values not less than a first threshold value as candidates for the face image;
   setting each of the candidates as a candidate of interest, and when any nearby candidate, whose coordinate distance from the candidate of interest is not more than a predetermined distance, is present in the candidates other than the candidate of interest, setting the candidate of interest and the nearby candidate in one candidate group;
   calculating for each candidate group, based on the indicator values calculated for the candidates forming the candidate group, an integrated indicator value reflecting magnitudes of the indicator values; and
   extracting, as the face image, an image within a predetermined area in the inputted image containing the candidate group having the integrated indicator value not less than a second threshold value.

2. A face detection method for detecting a face image contained in time-series images taken at a predetermined time interval, the method comprising the steps of:
   cutting out, for each of the time-series images, partial images having a predetermined size at different positions in the time-series image;
   calculating, for each of the partial images cut out at the different positions in each of the time-series images, an indicator value indicating a probability of the partial image being the face image;
   extracting all the partial images having the calculated indicator values not less than a first threshold value as candidates for the face image;
   setting each of the candidates as a candidate of interest, and when any nearby candidate, whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, setting the candidate of interest and the nearby candidate in one candidate group;
   calculating for each candidate group, based on the indicator values calculated for the candidates forming the candidate group, an integrated indicator value reflecting magnitudes of the indicator values; and
   extracting, as the face image, an image within a predetermined area containing the candidate in at least one of the time-series images that contain any of the candidates forming the candidate group having the integrated indicator value not less than a second threshold value.

3. The face detection method as claimed in claim 1, wherein:
   the step of cutting out the partial images comprises changing the predetermined size into different sizes and cutting out the partial image for each size; and
   the step of setting the candidate group comprises increasing the predetermined distance such that the larger the size of at least one of the candidate of interest and the other candidate, the larger the predetermined distance.

4. The face detection method as claimed in claim 1, wherein the integrated indicator value is a sum of the indicator values.

5. The face detection method as claimed in claim 1, wherein the first threshold value is a minimum value that may be taken by the indicator value.

6. The face detection method as claimed in claim 2, wherein:
   the step of cutting out the partial images comprises changing the predetermined size into different sizes and cutting out the partial image for each size; and
   the step of setting the candidate group comprises increasing the predetermined distance such that the larger the size of at least one of the candidate of interest and the other candidate, the larger the predetermined distance.

7. The face detection method as claimed in claim 2, wherein the integrated indicator value is a sum of the indicator values.

8. The face detection method as claimed in claim 2, wherein the first threshold value is a minimum value that may be taken by the indicator value.

9. A face detection device for detecting a face image contained in an inputted image, the device comprising:
   a partial image cutting means for cutting out partial images having a predetermined size at different positions in the inputted image;
   a first indicator value calculating means for calculating, for each of the partial images cut out at the different positions, an indicator value indicating a probability of the partial image being the face image;
   a face image candidate extracting means for extracting all the partial images having the calculated indicator values not less than a first threshold value as candidates for the face image;
   a candidate group setting means for setting each of the candidates as a candidate of interest, and when any nearby candidate, whose coordinate distance from the candidate of interest is not more than a predetermined distance, is present in the candidates other than the candidate of interest, setting the candidate of interest and the nearby candidate in one candidate group;
   a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area in the inputted image containing the candidate group having the integrated indicator value not less than a second threshold value image.

10. A face detection device for detecting a face image contained in time-series images taken at a predetermined time interval, the device comprising:

a partial image cutting means for cutting out, for each of the time-series images, partial images having a predetermined size at different positions in the time-series image;

a first indicator value calculating means for calculating, for each of the partial images cut out at the different positions in each of the time-series images, an indicator value indicating a probability of the partial image being the face image;

a face image candidate extracting means for extracting all the partial images having the calculated indicator values not less than a first threshold value as candidates for the face image;

a candidate group setting means for setting each of the candidates as a candidate of interest, and when any nearby candidate, whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, setting the candidate of interest and the nearby candidate in one candidate group;

a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area containing the candidate in at least one of the time-series images that contain any of the candidates forming the candidate group having the integrated indicator value not less than a second threshold value.

11. The face detection device as claimed in claim 9, wherein:

the partial image cutting means changes the predetermined size into different sizes and cuts out the partial image for each size; and the candidate group setting means increases the predetermined distance such that the larger the size of at least one of the candidate of interest and the other candidate, the larger the predetermined distance.

12. The face detection device as claimed in claim 9, wherein the integrated indicator value is a sum of the indicator values.

13. The face detection device as claimed in claim 9, wherein the first threshold value is a minimum value that may be taken by the indicator value.

14. The face detection device as claimed in claim 10, wherein:

the partial image cutting means changes the predetermined size into different sizes and cuts out the partial image for each size; and the candidate group setting means increases the predetermined distance such that the larger the size of at least one of the candidate of interest and the other candidate, the larger the predetermined distance.

15. The face detection device as claimed in claim 10, wherein the integrated indicator value is a sum of the indicator values.

16. The face detection device as claimed in claim 10, wherein the first threshold value is a minimum value that may be taken by the indicator value.

17. A computer readable storage medium storing a program for causing a computer to operate as a face detection device for detecting a face image contained in an inputted image, the program causing the computer to operate as:

a partial image cutting means for cutting out partial images having a predetermined size at different positions in the inputted image;

a first indicator value calculating means for calculating, for each of the partial images cut out at the different positions, an indicator value indicating a probability of the partial image being the face image;

a face image candidate extracting means for extracting all the partial images having the calculated indicator values not less than a first threshold value as candidates for the face image;

a candidate group setting means for setting each of the candidates as a candidate of interest, and when any nearby candidate, whose coordinate distance from the candidate of interest is not more than a predetermined distance, is present in the candidates other than the candidate of interest, setting the candidate of interest and the nearby candidate in one candidate group;

a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area in the inputted image containing the candidate group having the integrated indicator value not less than a second threshold value image.

18. A computer readable storage medium storing a program for causing a computer to operate as a face detection device for detecting a face image contained in an inputted image, the program causing the computer to operate as:

a partial image cutting means for cutting out, for each of the time-series images, partial images having a predetermined size at different positions in the time-series image;

a first indicator value calculating means for calculating, for each of the partial images cut out at the different positions in each of the time-series images, an indicator value indicating a probability of the partial image being the face image;

a face image candidate extracting means for extracting all the partial images having the calculated indicator values not less than a first threshold value as candidates for the face image;

a candidate group setting means for setting each of the candidates as a candidate of interest, and when any nearby candidate, whose coordinate distance from the candidate of interest is not more than a predetermined distance and which is contained in a time-series image that was taken at a time within a predetermined range from the time when the time-series image containing the candidate of interest was taken, is present in the candidates other than the candidate of interest, setting the candidate of interest and the nearby candidate in one candidate group;

a second indicator value calculating means for calculating for each candidate group, based on the indicator values calculated for the candidates forming the candidate group, an integrated indicator value reflecting magnitudes of the indicator values; and a face image extracting means for extracting, as the face image, an image within a predetermined area containing the candidate in at least one of the time-series images that contain any of the candidates forming the candidate group having the integrated indicator value not less than a second threshold value.

19. The computer readable storage medium storing a program as claimed in claim 17, wherein:

the partial image cutting means changes the predetermined size into different sizes and cuts out the partial image for each size; and the candidate group setting means increases the predetermined distance such that the larger the size of at least one of the candidate of interest and the other candidate, the larger the predetermined distance.

20. The computer readable storage medium storing a program as claimed in claim 17, wherein the integrated indicator value is a sum of the indicator values.

21. The computer readable storage medium storing a program as claimed in claim 17, wherein the first threshold value is a minimum value that may be taken by the indicator value.

22. The computer readable storage medium storing a program as claimed in claim 18, wherein:

the partial image cutting means changes the predetermined size into different sizes and cuts out the partial image for each size; and the candidate group setting means increases the predetermined distance such that the larger the size of at least one of the candidate of interest and the other candidate, the larger the predetermined distance.

23. The computer readable storage medium storing a program as claimed in claim 18, wherein the integrated indicator value is a sum of the indicator values.

24. The computer readable storage medium storing a program as claimed in claim 18, wherein the first threshold value is a minimum value that may be taken by the indicator value.

* * * * *